United States Patent
Byun et al.

(10) Patent No.: US 10,028,310 B2
(45) Date of Patent: Jul. 17, 2018

(54) METHOD AND APPARATUS FOR TRANSMITTING INFORMATION ON DEVICE-TO-DEVICE RESOURCES IN WIRELESS COMMUNICATION SYSTEM

(71) Applicant: LG Electronics Inc., Seoul (KR)

(72) Inventors: Daewook Byun, Seoul (KR); Jian Xu, Seoul (KR); Kyungmin Park, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/111,362

(22) PCT Filed: Jan. 20, 2015

(86) PCT No.: PCT/KR2015/000562
§ 371 (c)(1),
(2) Date: Jul. 13, 2016

(87) PCT Pub. No.: WO2015/111894
PCT Pub. Date: Jul. 30, 2015

(65) Prior Publication Data
US 2016/0338124 A1    Nov. 17, 2016

Related U.S. Application Data

(60) Provisional application No. 61/955,161, filed on Mar. 18, 2014, provisional application No. 61/946,889, (Continued)

(51) Int. Cl.
*H04W 4/00* (2018.01)
*H04W 76/02* (2009.01)
(Continued)

(52) U.S. Cl.
CPC ............ *H04W 76/023* (2013.01); *H04L 5/14* (2013.01); *H04W 8/005* (2013.01); *H04W 68/12* (2013.01);
(Continued)

(58) Field of Classification Search
None
See application file for complete search history.

(56) References Cited

U.S. PATENT DOCUMENTS

2012/0106517 A1* 5/2012 Charbit ................. H04W 72/04
370/336
2012/0243431 A1    9/2012 Chen et al.
(Continued)

FOREIGN PATENT DOCUMENTS

CN    102792745 A    11/2012

OTHER PUBLICATIONS

International Search Report and Written Opinion dated Mar. 26, 2015, for corresponding International Application No. PCT/KR2015/000562.
(Continued)

*Primary Examiner* — Jutai Kao
(74) *Attorney, Agent, or Firm* — Morgan, Lewis & Bockius LLP

(57) ABSTRACT

A method and apparatus for indicating a resource pool for device-to-device (D2D) transmission in a wireless communication system is provided. A first evolved NodeB (eNB) transmits information on a resource pool of the first eNB for D2D transmission to a second eNB. The second eNB also transmit information on a resource pool of the second eNB for D2D transmission.

15 Claims, 21 Drawing Sheets

Related U.S. Application Data filed on Mar. 3, 2014, provisional application No. 61/929,504, filed on Jan. 21, 2014.

(51) Int. Cl.

| | |
|---|---|
| *H04W 68/12* | (2009.01) |
| *H04W 76/00* | (2018.01) |
| *H04W 8/00* | (2009.01) |
| *H04W 72/04* | (2009.01) |
| *H04L 5/14* | (2006.01) |
| *H04W 76/14* | (2018.01) |
| *H04W 92/20* | (2009.01) |

(52) U.S. Cl.
CPC ....... *H04W 72/0426* (2013.01); *H04W 76/00* (2013.01); *H04W 76/14* (2018.02); *H04W 92/20* (2013.01)

(56) References Cited

U.S. PATENT DOCUMENTS

| | | | | |
|---|---|---|---|---|
| 2014/0242963 | A1* | 8/2014 | Novlan | H04W 48/16 455/418 |
| 2015/0009910 | A1* | 1/2015 | Ryu | H04W 72/04 370/329 |
| 2016/0174056 | A1* | 6/2016 | Nagata | H04W 8/005 370/329 |
| 2016/0277913 | A1* | 9/2016 | Harada | H04W 92/18 |
| 2017/0135144 | A1* | 5/2017 | Fujishiro | H04W 76/023 |
| 2017/0222772 | A1* | 8/2017 | Zhang | H04L 5/0012 370/330 |

OTHER PUBLICATIONS

Intel Corporation, 'Discussion on RAN2 Aspects of D2D Discovery', R2-132823, 3GPP TSG RAN WG2 Meeting #83, Barcelona, Spain, Aug. 10, 2013, see pp. 1-5.

Catt, 'D2D communication solutions', R2-132534, 3GPP TSG RAN WG2 Meeting #83, Barcelona, Spain, Aug. 9, 2013, see pp. 1-7.

Zte, 'Discussion on D2D Direct Communication', R2-132681, 3GPP TSG-RAN WG2 Meeting #83, Barcelona, Spain, Aug. 10, 2013, see pp. 1-5.

Etri, 'Discussion on Inter-Cell D2D Discovery', R2-134149, 3GPP TSG-RAN WG2 Meeting #84, San Francisco, USA, Aug. 31, 2013, see pp. 1-4.

European Search Report dated Jan. 18, 2018, for corresponding European Application No. 15 741 064.8.

Huawei et al., "Physical layer options for D2D discovery," R1-131864, 3GPP TSG RAN WG1 Meeting #73, Fukuoka, Japan, May 20-24, 2013, pp. 1-8.

"3rd Generation Partnership Project; Technical Specification Group Radio Access Network; Evolved Universal Terrestrial Radio Access (E-UTRA); Physical channels and modulation (Release 12)," 3GPP Standard; 3GPP TS 36.211, vol. RAN WG1, No. V12.0.0, Dec. 14, 2013, pp. 1-120, XP050729027.

Chinese Office Action dated Apr. 11, 2018, for corresponding Chinese Patent Application No. 201580005285.0.

ZTE, "Discussions on Public Safety Broadcast Communication," R1-133146, 3GPP TSG RAN WG1 Meeting #74, Barcelona, Spain, Aug. 19-23, 2013, pp. 1-9.

LG Electronics, "Resource Management for D2D Communications," R1-133791, 3GPP TSG RAN WG1 Meeting #74, Barcelona, Spain, Aug. 19-23, 2013, pp. 1-14.

Samsung, "In-band emission impact of D2D discovery," R1-135225, 3GPP TSG RAN WG1 Meeting #75, San Francisco, CA, USA, Nov. 11-15, 2013, pp. 1-6.

ASUSTeK, "Method of resource allocation for D2D discovery," R1-135617, 3GPP TSG RAN WG1 Meeting #75, San Francisco, CA, USA, Nov. 11-15, 2013, pp. 1-9.

CATT, "D2D discovery resource allocation within network coverage," R1-132533, 3GPP TSG Ran WG2 Meeting #83, Barcelona, Spain, Aug. 18-23, 2013, pp. 1-4.

\* cited by examiner (a)

(b)

METHOD AND APPARATUS FOR TRANSMITTING INFORMATION ON DEVICE-TO-DEVICE RESOURCES IN WIRELESS COMMUNICATION SYSTEM

BACKGROUND OF THE INVENTION

Field of the Invention

The present invention relates to wireless communications, and more particularly, to a method and apparatus for transmitting information on device-to-device (D2D) resources in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3-(a), the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 4 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Recently, there has been a surge of interest in supporting proximity-based service (ProSe), which can provide communication service between UEs which are in proximity each other. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a study item "Study on LTE Device to Device Proximity Services-Radio Aspects", 3GPP LTE has discussed device-to-device (D2D) discovery for discovering UE in proximity, and D2D communication for communicating with UE in proximity directly. Resources for D2D discovery and/or D2D communication may be newly defined. Accordingly, a method for indicating the D2D resources to neighboring eNB may be required.

SUMMARY OF THE INVENTION

The present invention provides a method and apparatus for transmitting information on device-to-device (D2D) resources in a wireless communication system. The present invention provides a method for indicating D2D resources to neighboring evolved NodeBs (eNBs). The present invention provides a method for expressing information on a resource pool for D2D.

In an aspect, a\A method for indicating, by a first evolved NodeB (eNB), a resource pool for device-to-device (D2D) transmission in a wireless communication system is provided. The method includes transmitting, by the first eNB, information on a resource pool of the first eNB for D2D transmission, and receiving, by the first eNB, information on a resource pool of a second eNB for D2D transmission.

In another aspect, a first evolved NodeB (eNB) configured to indicate a resource pool for device-to-device (D2D) transmission in a wireless communication system is provided. The first eNB includes a radio frequency (RF) unit configured to transmit or receive a radio signal, and a processor coupled to the RF unit, and configured to transmit information on a resource pool of the first eNB for D2D transmission, and receive information on a resource pool of a second eNB for D2D transmission.

An eNB can know D2D resources of neighboring eNB.

DESCRIPTION OF EXEMPLARY EMBODIMENTS

Figure 1:
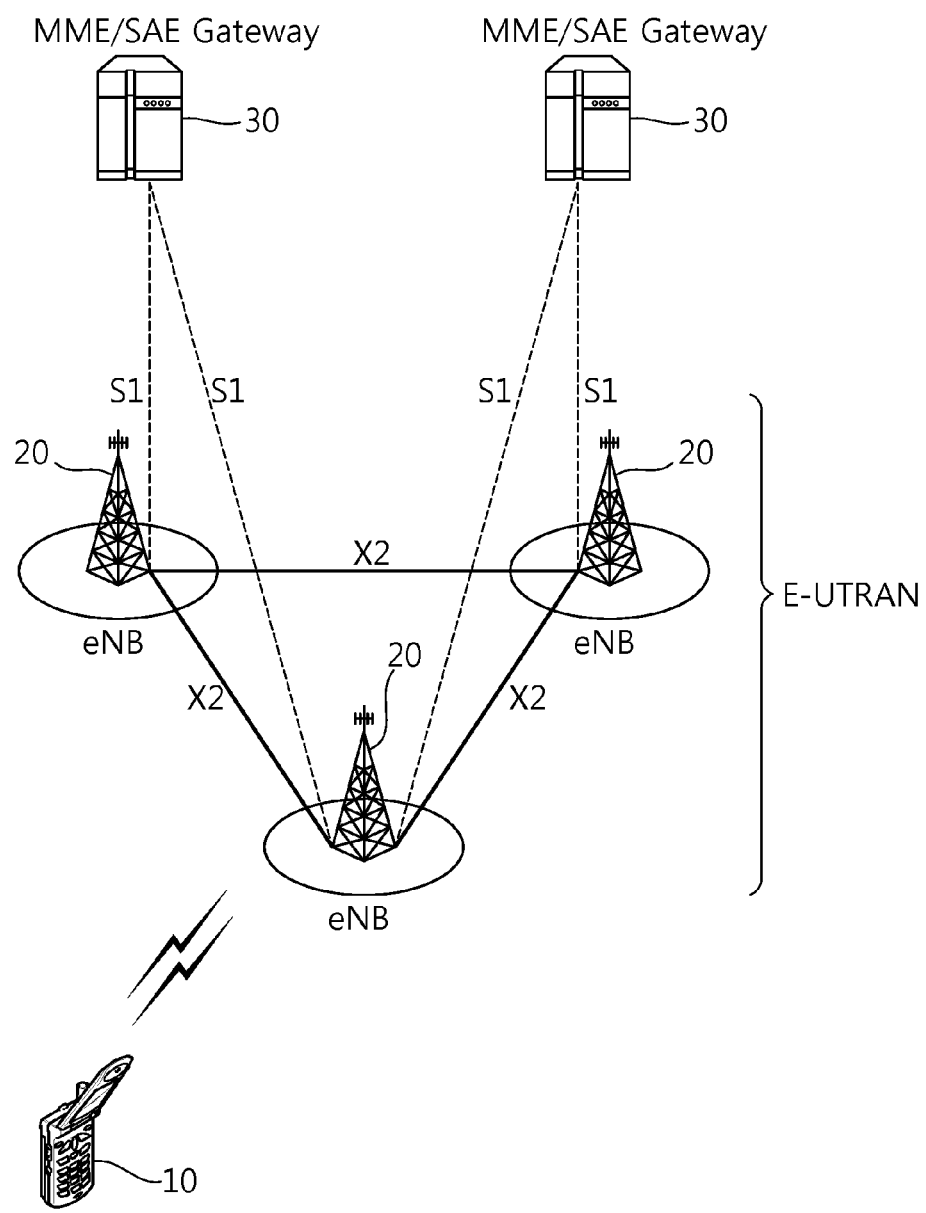
FIG. 1 shows LTE system architecture.
Figure 2:
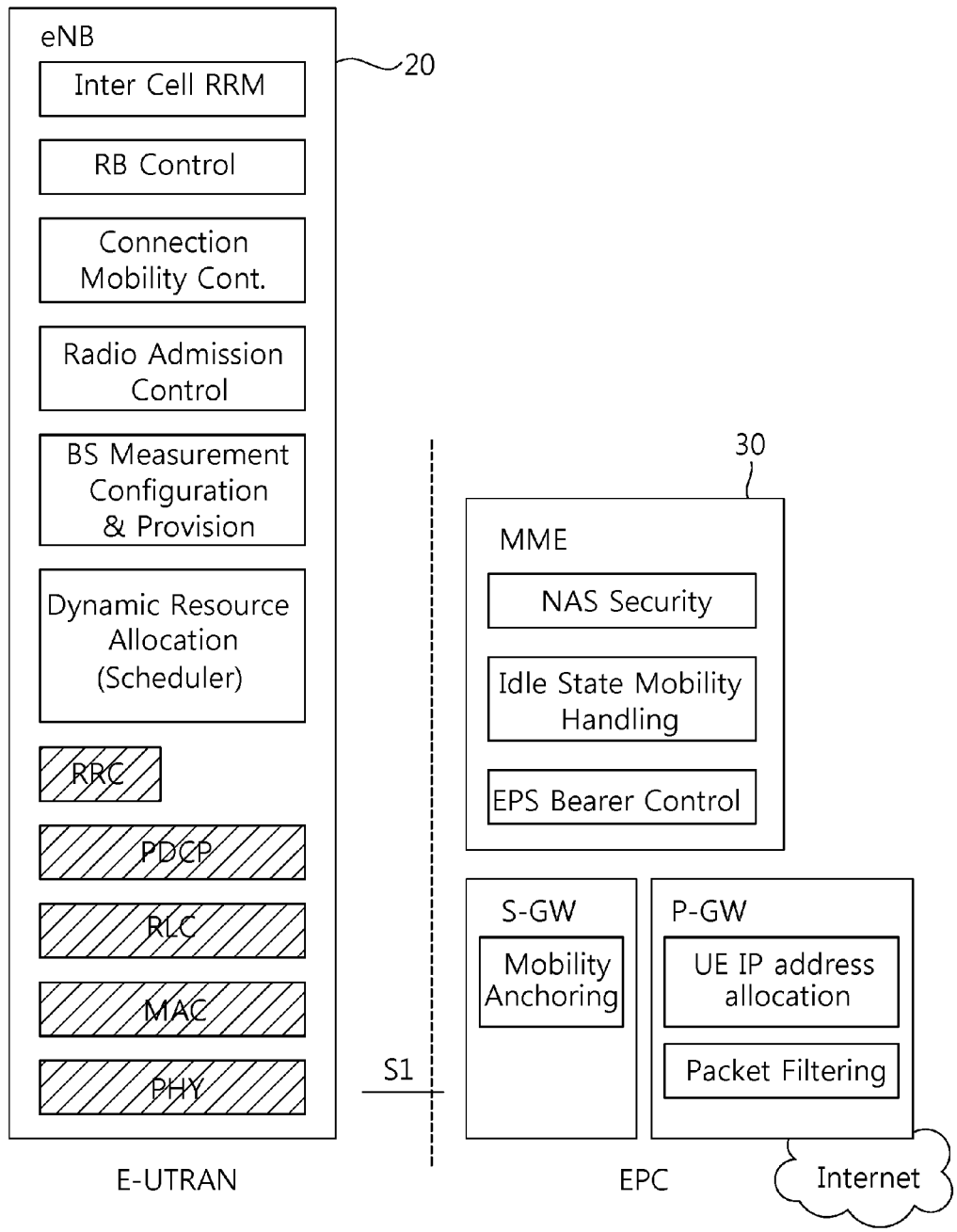
FIG. 2 shows a block diagram of architecture of a typical E-UTRAN and a typical EPC.
Figure 3:
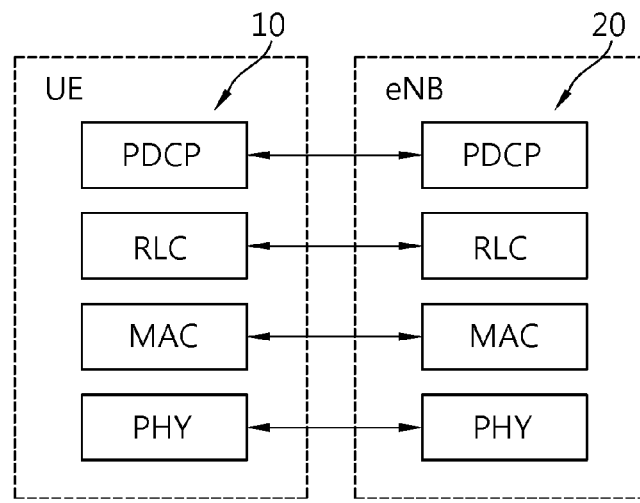
FIG. 3 shows a block diagram of a user plane protocol stack and a control plane protocol stack of an LTE system.
Figure 3:
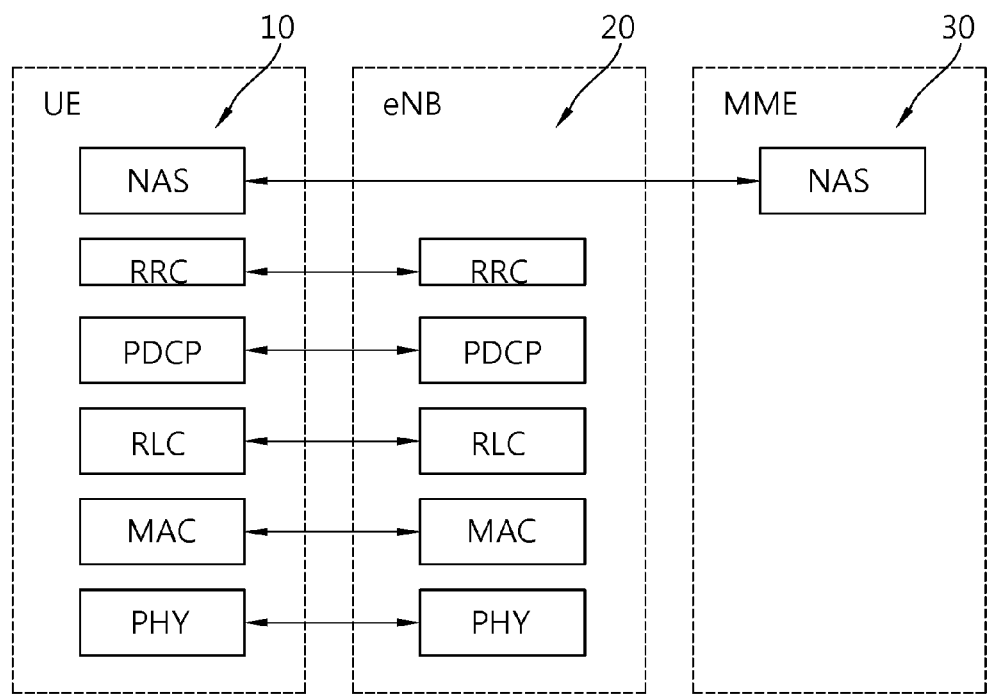
Figure 4:
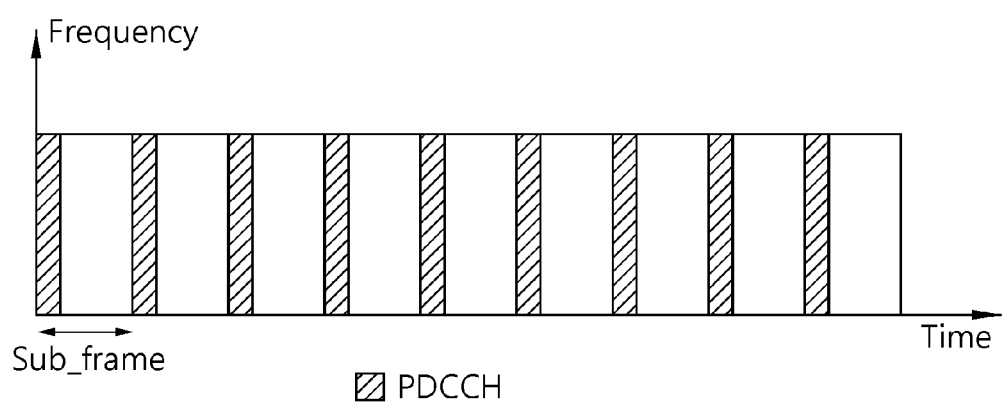
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Proximity services (ProSe) is described. It may be referred to 3GPP TR 36.843 V1.0.0 (2013-11). Proximity is determined ("a user equipment (UE) is in proximity of another UE") when given proximity criteria are fulfilled. Proximity criteria can be different for discovery and communication. ProSe is a service that may be provided by the 3GPP system based on UEs in proximity to each other. ProSe discovery is a process that identifies that a UE is in proximity of another, using E-UTRA. ProSe communication is a communication between two UEs in proximity by means of an E-UTRAN communication path established between the UEs. The communication path may for example be established directly between the UEs or routed via local evolved NodeB (eNB(s)). ProSe-enabled UE is a UE that supports ProSe discovery and/or ProSe communication. Unless explicitly stated otherwise, a UE refers to a ProSe-enabled UE. ProSe-enabled network is a network that supports ProSe discovery and/or ProSe communication. Unless explicitly stated otherwise, a network refers to a ProSe-enabled network.

ProSe may be referred to the other term, i.e., device-to-device (D2D). Hereinafter, ProSe and D2D are used by being mixed. For example, ProSe discovery and ProSe communication may be referred to D2D discovery and D2D communication, respectively.

LTE D2D proximity services may be evaluated as shown in Table 1.

TABLE 1

| | Within network coverage | Outside network coverage |
|---|---|---|
| Discovery | Non public safety & public safety requirements | Public safety only |
| Direct Communication | At least public safety requirements | Public safety only |

The following use cases are relevant for public safety (PS) ProSe communication.

Little or no coverage: Guaranteed communications through the network cannot be achieved either because of attenuation due to the local environment, the mobility of the users, or a simple lack of coverage. In these situations, the priority is to maintain communications with those at the incident, e.g., in buildings, on trains, between vehicles, in rural environments, underground.

Fall back: Used when there has been a complete network failure in an area that would typically have coverage, e.g., large scale natural disasters, power cuts, equipment failures.

Extra capacity: Used to provide extra capacity to manage some incidents. In existing systems, there are certain system constraints that limit the number of groups and group members that can operate in an area, so the ability to communicate directly can provide extra capacity, e.g., large metropolitan areas.

Local communication requirement: This is used in scenarios where there is no need to connect back to a control room or dispatch.

D2D discovery and D2D communication are described. Recently, it has been determined that both D2D discovery and D2D communication use uplink resources of an eNB, and full duplex is not used for a specific carrier during D2D transmission/reception.

For D2D discovery, at least the following two types of discovery procedure are defined. However, it is clear that these definitions are intended only to aid clarity for description and not to limit the scope of the present invention.

Type 1: a discovery procedure where resources for discovery signal transmission are allocated on a non UE specific basis. Resources can be for all UEs or group of UEs.

Type 2: a discovery procedure where resources for discovery signal transmission are allocated on a per UE specific basis. Resources may be allocated for each specific transmission instance of discovery signals, or may be semi-persistently allocated for discovery signal transmission.

FIG. 5 to FIG. 8 shows scenarios for D2D ProSe. Referring to FIG. 5 to FIG. 8, UE1 and UE2 are located in coverage/out of coverage of a cell. When UE1 has a role of transmission, UE1 sends discovery message and UE2 receives it. UE1 and UE2 can change their transmission and reception role. The transmission from UE1 can be received by one or more UEs like UE2. Table 2 shows more detailed D2D scenarios described in FIG. 5 to FIG. 8.

TABLE 2

Figure 5:
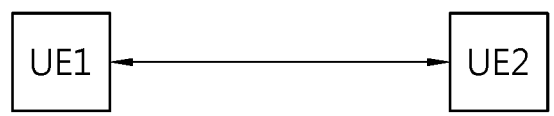
FIG. 5 to FIG. 8 shows scenarios for D2D ProSe.
Figure 6:
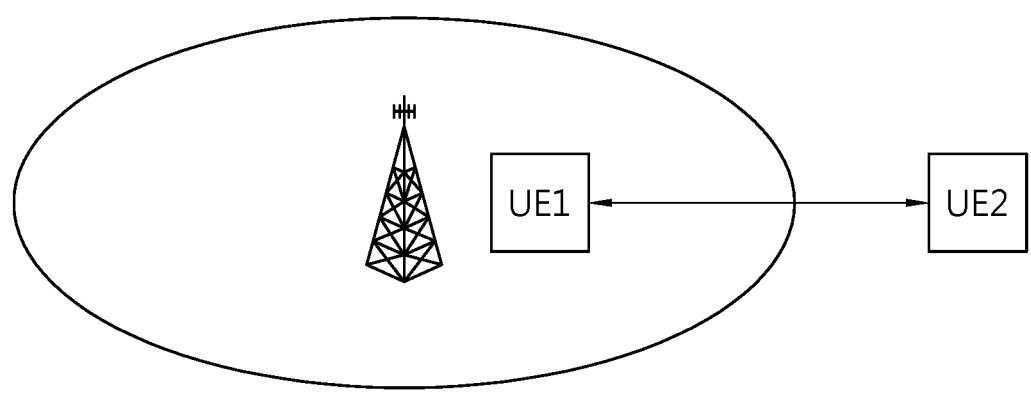
Figure 7:
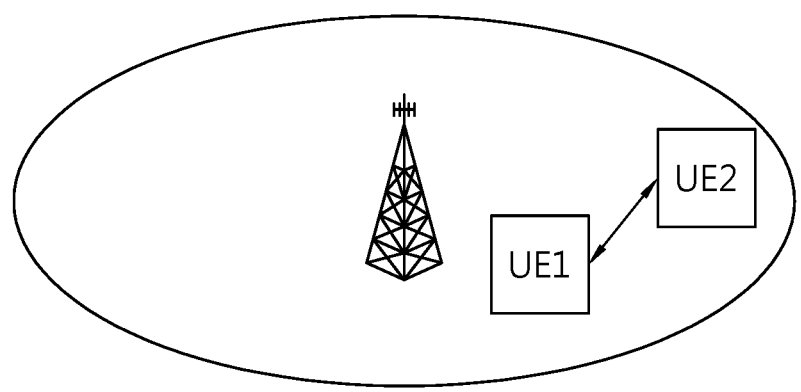
Figure 8:
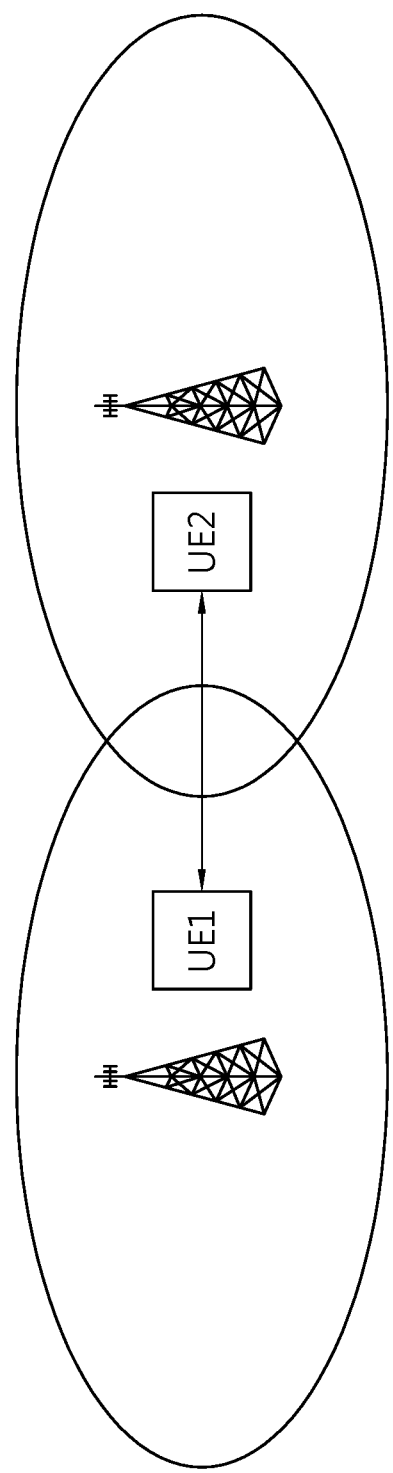

| Scenarios | UE1 | UE2 |
|---|---|---|
| FIG. 5: Out of Coverage | Out of Coverage | Out of Coverage |
| FIG. 6: Partial Coverage | In Coverage | Out of Coverage |
| FIG. 7: In Coverage-Single-Cell | In Coverage | In Coverage |
| FIG. 8: In Coverage-Multi-Cell | In Coverage | In Coverage |

Referring to Table 2, the scenario shown in FIG. 5 corresponds to a case that both UE1 and UE2 are out of coverage. The scenario shown in FIG. 6 corresponds to a case that UE1 is in coverage, but UE2 is out of coverage. The scenario shown in both FIG. 7 and FIG. 8 corresponds to a case that both UE1 and UE2 are in coverage. But, the scenario shown in FIG. 7 corresponds to a case that UE1 and UE2 are both in coverage of a single cell, while the scenario shown in FIG. 8 corresponds to a case that UE1 and UE2 are in coverage of multi-cells, respectively, which are neighboring each other.

For D2D communication, one UE searches a source of synchronization in the neighborhood in order to communicate with UE in proximity. After the UE performs synchronization with the source, the UE transmits packets to be transmitted. An eNB may be selected as the source of synchronization at first. If the eNB cannot be found, a UE which transmits a synchronization signal, among UEs in the neighborhood, may be selected as the source of synchronization. Currently, allocation of uplink resources for D2D communication has been discussed. Schemes for D2D communication are as follows.

Unicast communication: two UEs communicating with each other

Broadcast communication: one UE communicating with one or more other UEs

Groupcast communication: a group of UEs communicating with each other

UE-NW relay: a UE outside network coverage communicating to the network via a UE within coverage UE-UE relay: two UEs communicating with each other via another UE (either in or out of coverage)

In 3GPP LTE rel-12, only broadcast communication scheme, among various communication schemes described above, may be considered.

Figure 9:
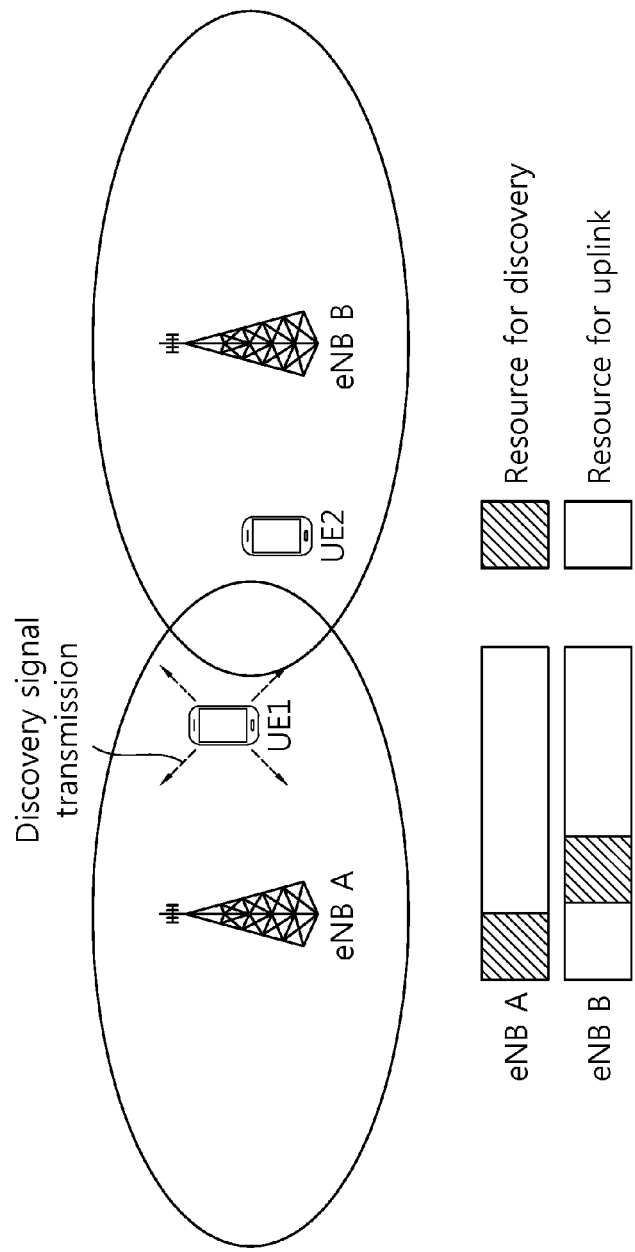
FIG. 9 shows an example of a problem which may occur for inter-eNB D2D discovery.

FIG. 9 shows an example of a problem which may occur for inter-eNB D2D discovery. The scenario shown in FIG. 9 corresponds to the scenario shown in FIG. 8, where two UEs in proximity are in coverage of multi-cells respectively.

Referring to FIG. 9, UE1 is in coverage of eNB A cell, and transmits a discovery signal. UE2 is in coverage of eNB B cell, and attempts to receive a discovery signal transmitted by UE1 in proximity. Both eNB A and eNB B allocate radio resource areas for D2D discovery (i.e., resource pool) to an uplink resource area, respectively. However, it is assumed in FIG. 9 that the resource pool of eNB A and the resource pool of eNB B are different from each other, and do not overlap each other. The resource pool may have a specific period. If eNB A and eNB B allocate different resource pools and do not know information on other eNB's resource pool, eNB B will schedule uplink for UEs in coverage of eNB B cell in the resource pool of eNB A. Further, since UE2, which camps on eNB B, may recognize the resource pool of eNB A as a resource area for an uplink signal, UE2 may recognize the discovery signal of UE1 as an uplink signal. Therefore, the UE2 cannot receive the discovery signal of UE1 even though UE1 is in proximity of UE2, and accordingly, D2D discovery cannot be performed appropriately.

In order to solve the problem describe above, a method for indicating information on a resource pool for D2D discovery to neighboring eNBs according to an embodiment of the present invention may be proposed. According to an embodiment of the present invention, an eNB supporting D2D may indicate information on a resource pool for D2D discovery to neighboring eNBs by using various schemes and/or procedures. According to an embodiment of the present invention, the information on the resource pool for D2D discovery to be exchanged may be expressed by various methods, e.g., various information elements (IEs). Further, according to an embodiment of the present invention, an eNB supporting D2D may indicate information on a resource pool for D2D communication to neighboring eNBs by using various schemes and/or procedures. Information on the resource pool for D2D communication to be exchanged may have the same form as the information on the resource pool for D2D discovery, but may have different names from each other.

Hereinafter, for the convenience of the description, a method for indicating information on a resource pool for D2D discovery is only described, but it is clear that the present invention can be applied to a method for indicating information on a resource pool for D2D communication.

(1) Method Using an X2 Setup Procedure and/or eNB Configuration Update Procedure In order to inform a resource pool for D2D discovery to neighboring eNBs, the X2 setup procedure may be used. The purpose of the X2 setup procedure is to exchange application level configuration data needed for two eNBs to interoperate correctly over the X2 interface. This procedure erases any existing application level configuration data in the two nodes and replaces it by the one received. This procedure also resets the X2 interface like a reset procedure would do. Alternatively, when X2 interface exists between neighboring eNBs and a resource pool for D2D discovery in a specific eNB changes, the eNB configuration update procedure may be used. The purpose of the eNB configuration update procedure is to update application level configuration data needed for two eNBs to interoperate correctly over the X2 interface.

An X2 setup request/response message is transmitted during the X2 setup procedure, and an eNB configuration update message is transmitted during the eNB configuration update procedure. According to an embodiment of the present invention, "Served Cell Information IE" in the corresponding messages may indicate a resource pool for D2D discovery. That is, the Served Cell Information IE indicating the resource pool for D2D discovery may be included in the X2 setup request/response message or the eNB configuration update message. The resource pool for D2D discovery may be defined by parameters such as frequency, time, combination of frequency and time (e.g., resource block), subframe, or combination thereof. Further, the resource pool for D2D discovery may be defined differently for frequency division duplex (FDD) frame structure and time division duplex (TDD) frame structure.

Table 3 shows an example of the Served Cell Information IE according to an embodiment of the present invention.

TABLE 3

| IE/Group Name | Presence | Range | IE type and reference | Semantics description | Criticality | Assigned Criticality |
|---|---|---|---|---|---|---|
| PCI | M | | INTEGER (0 . . . 503, . . .) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 . . . <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >>>DL EARFCN | M | | EARFCN 9.2.26 | Corresponds to $N_{DL}$ in TS 36.104 [16] | — | — |

TABLE 3-continued

| IE/Group Name | Presence | Range | IE type and reference | Semantics description | Criticality | Assigned Criticality |
|---|---|---|---|---|---|---|
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signalled in the UL EARFCN IE is ignored. | YES | reject |
| >>>DL EARFCN Extension | O | | EARFCN Extension 9.2.65 | If this IE is present, the value signalled in the DL EARFCN IE is ignored. | YES | reject |
| >>>D2D Resource Area | | 0 | | Indicate the resource area for D2D Discovery | YES | ignore |
| >>>>Discovery Resource Area | M | | | | | |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED (sa0, sa1, sa2, sa3, sa4, sa5, sa6, . . .) | Uplink-downlink subframe configuration information defined in TS 36.211 [10] | — | — |
| >>>Special Subframe Info | | 1 | | Special subframe configuration information defined in TS 36.211 [10] | | |
| >>>>Special Subframe Patterns | M | | ENUMERATED (ssp0, ssp1, ssp2, ssp3, ssp4, ssp5, ssp6, ssp7, ssp8, . . .) | | — | — |
| >>EARFCN Extension | O | | 9.2.65 | If this IE is present, the value signalled in the EARFCN IE is ignored. | YES | reject |
| >>>>Cyclic Prefix DL | M | | ENUMERATED (Normal, Extended, . . .) | | — | — |
| >>>>Cyclic Prefix UL | M | | ENUMERATED (Normal, Extended, . . .) | | — | — |
| >>>Additional Special Subframe Info | O | | | Special subframe configuration information defined in TS 36.211 [10]. Only for newly defined configuration of special subframe from Release 11. | GLOBAL | ignore |
| >>>>Additional Special Subframe Patterns | M | | ENUMERATED (ssp0, ssp1, ssp2, ssp3, ssp4, ssp5, ssp6, ssp7, ssp8, ssp9, . . .) | | — | — |

TABLE 3-continued

| IE/Group Name | Presence | Range | IE type and reference | Semantics description | Criticality | Assigned Criticality |
|---|---|---|---|---|---|---|
| >>>>Cyclic Prefix DL | M | | ENUMERATED (Normal, Extended, . . .) | | — | — |
| >>>>Cyclic Prefix UL | M | | ENUMERATED (Normal, Extended, . . .) | | — | — |
| >>>D2D Resource Area | | 0 | | Indicate the resource area for D2D Discovery | YES | ignore |
| >>>>Discovery Resource Area | M | | | | | |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED (n1, n2, n4, n8, n16, n32, . . .) | | — | — |
| >Radioframe Allocation Offset | M | | INTEGER (0 . . . 7, . . .) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

Referring to Table 3, the Served Cell Information IE includes "D2D Resources Area" IE and "Discovery Resource Area" IE which indicate the resource area for D2D discovery, for both FDD frame structure and TDD frame structure.

Figure 10:
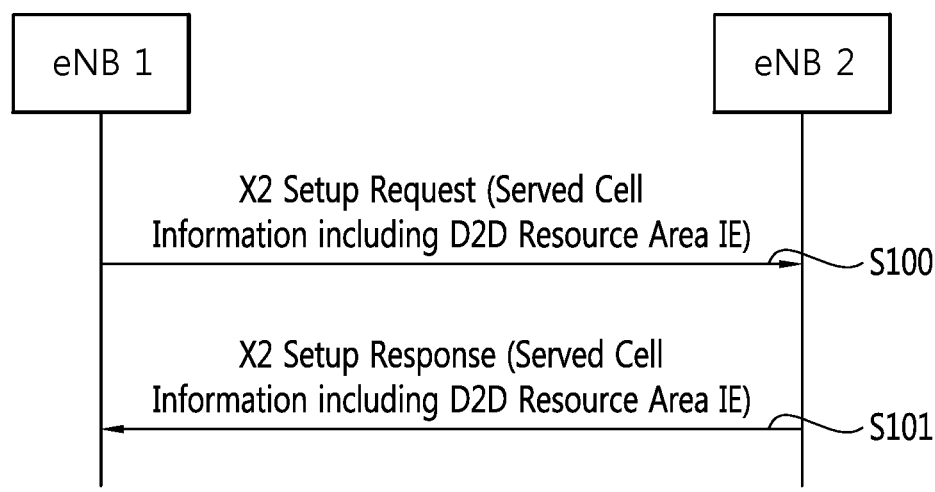
FIG. 10 shows an example of an X2 setup procedure according to an embodiment of the present invention.

FIG. 10 shows an example of an X2 setup procedure according to an embodiment of the present invention. In step S100, the eNB1 transmits an X2 setup request message to the eNB2. The X2 setup request message may include the Served Cell Information IE including the D2D Resource Area IE, described in Table 3. In step S101, the eNB2 transmits an X2 setup response message to the eNB1. The X2 setup response message may include the Served Cell Information IE including the D2D Resource Area IE, described in Table 3. Each eNB may allocate the resource pool for D2D discovery based on the received information.

Figure 11:
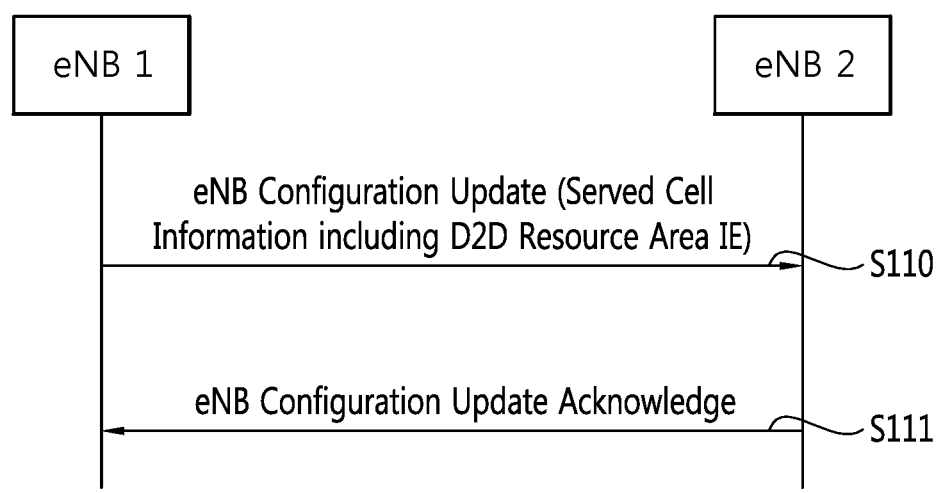
FIG. 11 shows an example of an eNB configuration update procedure according to an embodiment of the present invention.

FIG. 11 shows an example of an eNB configuration update procedure according to an embodiment of the present invention. In step S110, the eNB1 transmits an eNB configuration update message to the eNB2. The eNB configuration update message may include the Served Cell Information IE including the D2D Resource Area IE, described in Table 3. In step S111, the eNB2 transmits an eNB configuration update acknowledge message to the eNB1. The eNB2 may allocate the resource pool for D2D discovery based on the received information from the eNB1.

Meanwhile, the D2D Resource Area IE shown in Table 3 just indicates the resource pool for D2D discovery abstractly. Information on the resource pool for D2D discovery is described in detail. The information on the resource pool for D2D discovery may include information on a period of the resource pool for D2D discovery. The resource pool for D2D discovery for FDD frame structure may be expressed as combination of a resource block and a subframe number.

The resource pool for D2D discovery for TDD frame structure may be dependent on or independent from uplink-downlink configurations. Table 4 shows the uplink-downlink configurations.

TABLE 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For option 1, if the resource pool for D2D discovery for TDD frame structure is dependent on the uplink-downlink configurations shown in Table 4, the resource pool for D2D discovery for TDD frame structure may be expressed as combination of an uplink-downlink configuration number in Table 4, subframe number(s) used for D2D discovery in Table 4, and physical uplink shared channel (PUSCH) region (which can be expressed in a unit of resource blocks). For option 2, if the resource pool for D2D discovery for TDD frame structure is independent from the uplink-downlink configurations shown in Table 4, the resource pool for D2D discovery for TDD frame structure may be expressed as combination of the number of consecutive uplink subframe(s) used for D2D discovery in Table 4, and PUSCH region (which can be expressed in a unit of resource blocks).

In order to inform information on a resource pool for D2D discovery to neighboring eNBs, the X2 setup procedure may be used. Alternatively, when X2 interface exists between neighboring eNBs and a resource pool for D2D discovery in a specific eNB changes, the eNB configuration update procedure may be used. According to an embodiment of the present invention, "Served Cell Information IE" in the corresponding messages may include information on a resource pool for D2D discovery. That is, the Served Cell Information IE including information on the resource pool for D2D discovery may be included in the X2 setup request/response message or the eNB configuration update message. Since the eNB may use type 1 and/or type 2 for allocating resources for D2D discovery, information on the resource pool for D2D discovery may be expressed per each type, distinctively. Similarly, since the eNB may use mode 1 and/or mode 2 for allocating resources for D2D communication, information on the resource pool for D2D communication may be expressed per each mode, distinctively.

Table 5 shows an example of the Served Cell Information IE according to an embodiment of the present invention.

TABLE 5

| IE/Group Name | Presence | Range | IE type and reference | Semantics description | Criticality | Assigned Criticality |
|---|---|---|---|---|---|---|
| PCI | M | | INTEGER (0 ... 503, ...) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | | |
| >>>UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >>>DL EARFCN | M | | EARFCN 9.2.26 | Corresponds to $N_{DL}$ in TS 36.104 [16] | — | — |
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signalled in the UL EARFCN IE is ignored. | YES | reject |

TABLE 5-continued

| IE/Group Name | Presence | Range | IE type and reference | Semantics description | Criticality | Assigned Criticality |
|---|---|---|---|---|---|---|
| >>>DL EARFCN Extension | O | | EARFCN Extension 9.2.65 | If this IE is present, the value signalled in the DL EARFCN IE is ignored. | YES | reject |
| >>>D2D Resource Pool 1 | | 0 | | Indicate information related to resource pool for D2D Discovery in Type 1 | YES | ignore |
| >>>>Resource Pool Period | M | | | | | |
| >>>>Resource Block | M | | | Number of frequency resources allocated for D2D discovery | | |
| >>>>Subframe Number | M | | | Number of time resources allocated for D2D discovery | | |
| >>>D2D Resource Pool 2 | | 0 | | Indicate information related to resource pool for D2D Discovery in Type 2 | YES | ignore |
| >>>>Resource Pool Period | M | | | | | |
| >>>>Resource Block | M | | | Number of frequency resources allocated for D2D discovery | | |
| >>>>Subframe Number | M | | | Number of time resources allocated for D2D discovery | | |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED(sa0, sa1, sa2, sa3, sa4, sa5, sa6, . . .) | Uplink-downlink subframe configuration information defined in TS 36.211 [10]. If eNB can support D2D, indicate resource pool for D2D Discovery in Option 1. | — | — |
| >>>D2D Resource Pool 1 | | 0 | | Indicate information related to resource pool for D2D Discovery in Type 1 and Option 1 | YES | ignore |
| >>>>Resource Pool Period | M | | | | | |
| >>>>Subframe Number | M | | ENUMERATED(sn2, sn3, sn4, sn7, sn8, sn9, . . .) | Subframe number information used for discovery. Subframe number information defined in TS 36.211 [10]. | — | — |
| >>>>PUSCH Region | M | | | Number of frequency resources allocated for D2D discovery except PUCCH | | |
| >>>D2D Resource Pool 2 | | 0 | | Indicate information related to resource pool for D2D Discovery in Type 2 and Option 1 | YES | ignore |

TABLE 5-continued

| IE/Group Name | Presence | Range | IE type and reference | Semantics description | Criticality | Assigned Criticality |
|---|---|---|---|---|---|---|
| >>>>Resource Pool Period | M | | | | — | — |
| >>>>Subframe Number | M | | ENUMERATED(sn2, sn3, sn4, sn7, sn8, sn9, . . .) | Subframe number information used for discovery. Subframe number information defined in TS 36.211 [10]. | — | — |
| >>>>PUSCH Region | M | | | Number of frequency resources allocated for D2D discovery except PUCCH | — | — |
| >>>Special Subframe Info | | 1 | | Special subframe configuration information defined in TS 36.211 [10] | — | — |
| >>>>Special Subframe Patterns | M | | ENUMERATED(ssp0, ssp1, ssp2, ssp3, ssp4, ssp5, ssp6, ssp7, ssp8, . . .) | | — | — |
| >>EARFCN Extension | O | | 9.2.65 | If this IE is present, the value signalled in the EARFCN IE is ignored. | YES | reject |
| >>>>Cyclic Prefix DL | M | | ENUMERATED(Normal, Extended, . . .) | | — | — |
| >>>>Cyclic Prefix UL | M | | ENUMERATED(Normal, Extended, . . .) | | — | — |
| >>>Additional Special Subframe Info | O | | | Special subframe configuration information defined in TS 36.211 [10]. Only for newly defined configuration of special subframe from Release 11. | GLOBAL | ignore |
| >>>>Additional Special Subframe Patterns | M | | ENUMERATED(ssp0, ssp1, ssp2, ssp3, ssp4, ssp5, ssp6, ssp7, ssp8, ssp9, . . .) | | — | — |
| >>>>Cyclic Prefix DL | M | | ENUMERATED(Normal, Extended, . . .) | | — | — |
| >>>>Cyclic Prefix UL | M | | ENUMERATED(Normal, Extended, . . .) | | — | — |
| >>>D2D Resource Pool 1 | | 0 | | Indicate information related to resource pool for D2D Discovery in Type 1 and Option 2 | YES | ignore |
| >>>>Resource Pool Period | M | | | | — | — |
| >>>>Discovery Subframes | M | | INTEGER (2, 3, . . .) | Number of contiguous subframes which are reserved for uplink transmission | — | — |
| >>>>PUSCH Region | M | | | Number of frequency resources allocated for D2D discovery except PUCCH | — | — |
| >>>D2D Resource Pool 2 | | 0 | | Indicate information related to resource pool for D2D Discovery in Type 2 and Option 2 | YES | ignore |
| >>>>Resource Pool Period | M | | | | — | — |
| >>>>Discovery Subframes | M | | INTEGER (2, 3, . . .) | Number of contiguous subframes which are reserved for uplink transmission | — | — |

TABLE 5-continued

| IE/Group Name | Presence | Range | IE type and reference | Semantics description | Criticality | Assigned Criticality |
|---|---|---|---|---|---|---|
| >>>>PUSCH Region | M | | | Number of frequency resources allocated for D2D discovery except PUCCH | — | — |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED(n1, n2, n4, n8, n16, n32, . . .) | | — | — |
| >Radioframe Allocation Offset | M | | INTEGER (0 . . . 7, . . .) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

Referring to Table 5, for FDD frame structure, the Served Cell Information IE includes "D2D Resource Pool 1" IE which indicates information related to the resource pool for D2D discovery in type 1, and "D2D Resource Pool 2" IE which indicates information related to the resource pool for D2D Discovery in type 2. Both IEs include "Resource Pool Period" IE, "Resource Block" IE which indicates the number of frequency resources allocated for D2D discovery, and "Subframe Number" IE which indicates the number of time resources allocated for D2D discovery.

Further referring to Table 5, for TDD frame structure, the Served Cell Information IE includes "Subframe Assignment" IE which indicates the resource pool for D2D discovery in option 1 if the eNB can support D2D. For option 1 described above, the Served Cell Information IE includes "D2D Resource Pool 1" IE which indicates information related to the resource pool for D2D discovery in type 1 and option 1, and "D2D Resource Pool 2" IE which indicates information related to the resource pool for D2D discovery in type 2 and option 1. Both IEs include "Resource Pool Period" IE, "Subframe Number" IE which indicates Subframe number information used for D2D discovery, and "PUSCH Region" IE which indicates the number of frequency resources allocated for D2D discovery except a physical uplink control channel (PUCCH). For option 2 described above, the Served Cell Information IE includes "D2D Resource Pool 1" IE which indicates information related to the resource pool for D2D discovery in type 1 and option 2, and "D2D Resource Pool 2" IE which indicates information related to the resource pool for D2D discovery in type 2 and option 2. Both IEs include "Resource Pool Period" IE, "Discovery Subframes" IE which indicates the number of contiguous subframes which are reserved for uplink transmission, and "PUSCH Region" IE which indicates the number of frequency resources allocated for D2D discovery except the PUCCH.

Figure 12:
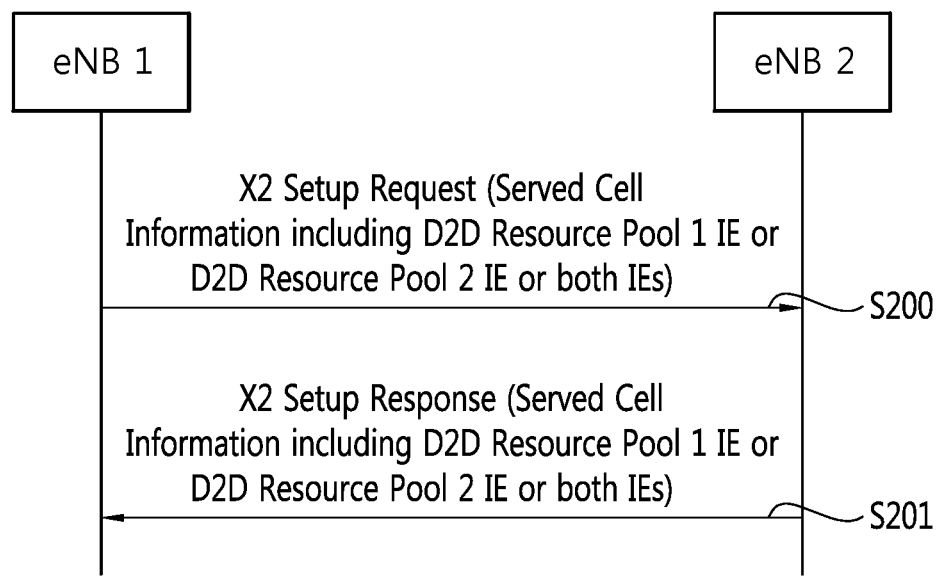
FIG. 12 shows another example of an X2 setup procedure according to an embodiment of the present invention.

FIG. 12 shows another example of an X2 setup procedure according to an embodiment of the present invention. In step S200, the eNB1 transmits an X2 setup request message to the eNB2. The X2 setup request message may include the Served Cell Information IE including the D2D Resource Pool 1 IE or D2D Resource Pool 2 IE or both IEs, described in Table 5. In step S201, the eNB2 transmits an X2 setup response message to the eNB1. The X2 setup response message may include the Served Cell Information IE including the D2D Resource Pool 1 IE or D2D Resource Pool 2 IE or both IEs, described in Table 5. Each eNB may allocate the resource pool for D2D discovery based on the received information.

Figure 13:
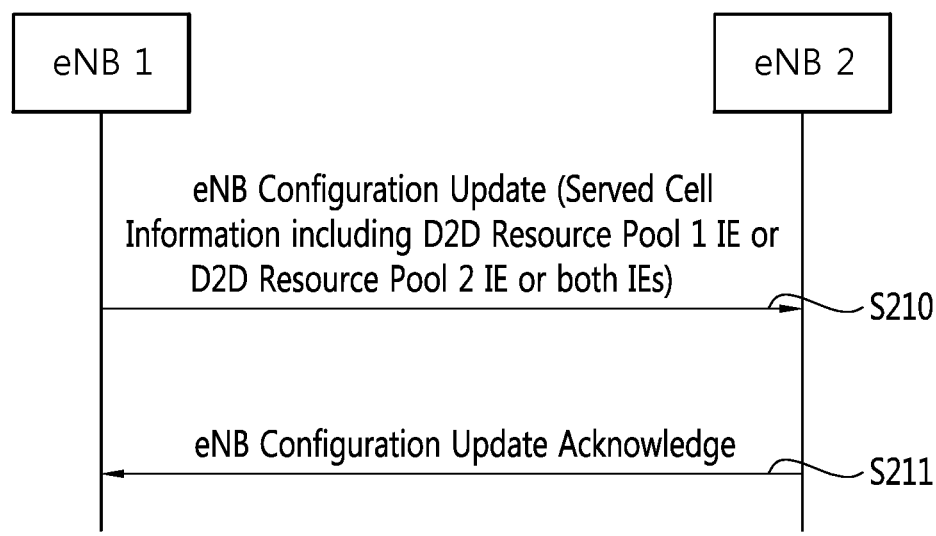
FIG. 13 shows another example of an eNB configuration update procedure according to an embodiment of the present invention.

FIG. 13 shows another example of an eNB configuration update procedure according to an embodiment of the present invention. In step S210, the eNB1 transmits an eNB configuration update message to the eNB2. The eNB configuration update message may include the Served Cell Information IE including the D2D Resource Pool 1 IE or D2D Resource Pool 2 IE or both IEs, described in Table 5. In step S211, the eNB2 transmits an eNB configuration update acknowledge message to the eNB1. The eNB2 may allocate the resource pool for D2D discovery based on the received information from the eNB 1.

A discovery region is described. For the resource pool for D2D discovery, the discovery region in which the resource pool is actually allocated may be newly defined.

Figure 14:
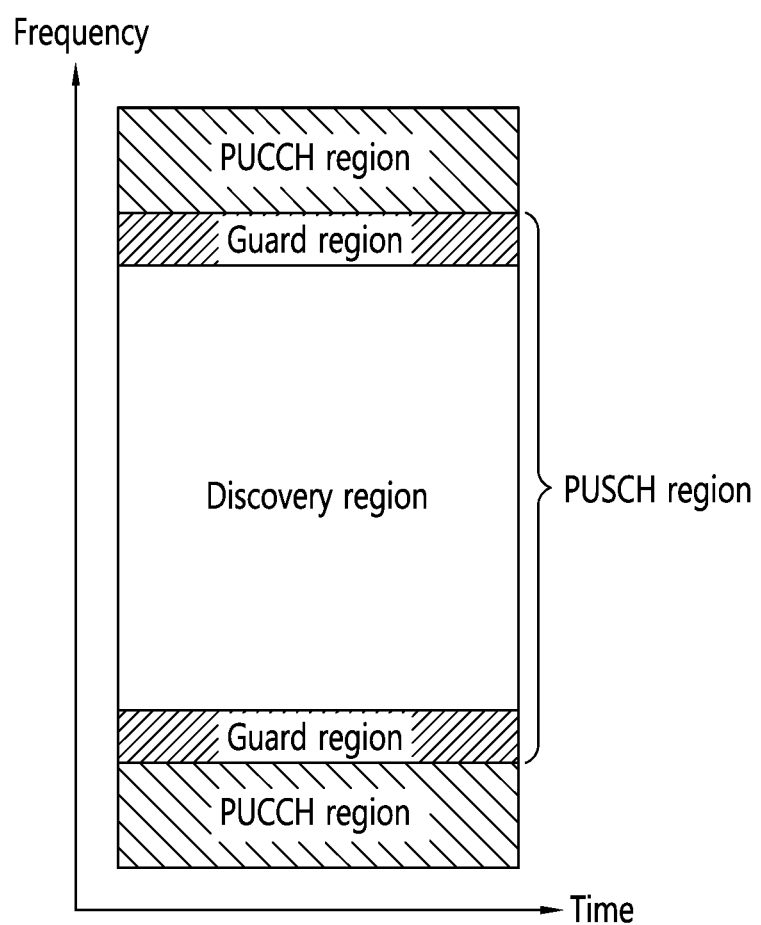
FIG. 14 shows an example of an uplink physical channel in one subframe according to an embodiment of the present invention.

FIG. 14 shows an example of an uplink physical channel in one subframe according to an embodiment of the present invention. Referring to FIG. 14, the uplink physical channel is divided into a PUCCH region and PUSCH region, and the PUSCH region is further divided into a guard region and discovery region. That is, the discovery region is the remaining region that excludes the guard region from the PUSCH region. The guard region is a region for avoiding inter-cell interference (ICI) to the PUCCH region. When UE in RRC_IDLE transmits a discovery signal in the PUSCH region, the ICI may occur due to misalignment of transmission timing in eNB since UEs do not know timing advance (TA).

The information on the resource pool for D2D discovery may include information on a period of the resource pool for D2D discovery. By using the discovery region, the resource pool for D2D discovery for FDD frame structure may be expressed as combination of the discovery region, the number of resource blocks and the number of subframes.

The resource pool for D2D discovery for TDD frame structure may be dependent on or independent from uplink-downlink configurations shown in Table 4. For option 1, if the resource pool for D2D discovery for TDD frame structure is dependent on the uplink-downlink configurations, by using the discovery region, the resource pool for D2D discovery for TDD frame structure may be expressed as combination of the discovery region, an uplink-downlink configuration number in Table 4, uplink subframe number(s) used for D2D discovery in Table 4, and the number of radio frames used for D2D discovery. For option 2, if the resource pool for D2D discovery for TDD frame structure is independent from the uplink-downlink configurations shown in Table 4, the resource pool for D2D discovery for TDD frame structure may be expressed as combination of the discovery region, the number of consecutive uplink subframe(s) used for D2D discovery in Table 4, and the number of radio frames used for D2D discovery.

Table 6 shows an example of the Served Cell Information IE according to an embodiment of the present invention.

TABLE 6

| IE/Group Name | Presence | Range | IE type and reference | Semantics description | Criticality | Assigned Criticality |
|---|---|---|---|---|---|---|
| PCI | M | | INTEGER (0 . . . 503, . . .) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 . . . <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | 1 | | | | | |
| >>>UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >>>DL EARFCN | M | | EARFCN 9.2.26 | Corresponds to $N_{DL}$ in TS 36.104 [16] | — | — |
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signalled in the UL EARFCN IE is ignored. | YES | reject |
| >>>DL EARFCN Extension | O | | EARFCN Extension 9.2.65 | If this IE is present, the value signalled in the DL EARFCN IE is ignored. | YES | reject |
| >>>Discovery Resource Pool 1 | 0 | | | Indicate information related to resource pool for D2D Discovery in Type 1 | YES | ignore |
| >>>>Resource Pool Period | O | | | | | |
| >>>>Discovery Region | O | | | Indicate the region which subtracts guard region from PUSCH region | | |
| >>>>Resource Block | O | | | Number of frequency resources allocated for D2D Discovery | | |
| >>>>Subframe Number | O | | | Number of time resources allocated for D2D Discovery | | |

TABLE 6-continued

| IE/Group Name | Presence | Range | IE type and reference | Semantics description | Criticality | Assigned Criticality |
|---|---|---|---|---|---|---|
| >>>Discovery Resource Pool 2 | | 0 | | Indicate information related to resource pool for D2D Discovery in Type 2 | YES | ignore |
| >>>>Resource Pool Period | O | | | | | |
| >>>>Discovery Region | O | | | Indicate the region which subtracts guard region from PUSCH region | | |
| >>>>Resource Block | O | | | Number of frequency resources allocated for D2D Discovery | | |
| >>>>Subframe Number | O | | | Number of time resources allocated for D2D Discovery | | |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED(sa0, sa1, sa2, sa3, sa4, sa5, sa6, . . .) | Uplink-downlink subframe configuration information defined in TS 36.211 [10]. If eNB can support D2D, include resource pool for D2D Discovery in Option 1. | — | — |
| >>>Discovery Resource Pool 1 | | 0 | | Indicate information related to resource pool for D2D Discovery in Type 1 and Option 1 | YES | ignore |
| >>>>Resource Pool Period | O | | | | | |
| >>>>Discovery Region | O | | | Indicate the region which subtracts guard region from PUSCH region | | |
| >>>>Subframe Number | O | | BITSTRING(SIZE(6)) | A set of subframe(s) which can be used for D2D Discovery. The bitmap from the least significant bit position to the most significant bit position represents subframes #{2, 3, 4, 7, 8, 9} in a radio frame. Value "1" in a bit position indicates that the corresponding subframe can be used for D2D Discovery; and value "0" indicates otherwise. | — | — |
| >>>>Radio Frame Number | O | | | Indicate number of radio frame used for D2D Discovery | | |
| >>>Discovery Resource Pool 2 | | 0 | | Indicate information related to resource pool for D2D Discovery in Type 2 and Option 1 | YES | ignore |

TABLE 6-continued

| IE/Group Name | Presence | Range | IE type and reference | Semantics description | Criticality | Assigned Criticality |
|---|---|---|---|---|---|---|
| >>>>Resource Pool Period | O | | | | | |
| >>>>Discovery Region | O | | | Indicate the region which subtracts guard region from PUSCH region | | |
| >>>>Subframe Number | O | | BITSTRING(SIZE(6)) | A set of subframe(s) which can be used for D2D Discovery. The bitmap from the least significant bit position to the most significant bit position represents subframes #{2, 3, 4, 7, 8, 9} in a radio frame. Value "1" in a bit 1 position indicates that the corresponding subframe can be used for D2D Discovery; and value "0" indicates otherwise. | — | — |
| >>>>Radio Frame Number | O | | | Indicate number of radio frame used for D2D Discovery | | |
| >>>Special Subframe Info | | 1 | | Special subframe configuration information defined in TS 36.211 [10] | — | — |
| >>>>Special Subframe Patterns | M | | ENUMERATED(ssp0, ssp1, ssp2, ssp3, ssp4, ssp5, ssp6, ssp7, ssp8, . . .) | | — | — |
| >>EARFCN Extension | O | | 9.2.65 | If this IE is present, the value signalled in the EARFCN IE is ignored. | YES | reject |
| >>>>Cyclic Prefix DL | M | | ENUMERATED(Normal, Extended, . . .) | | — | — |
| >>>>Cyclic Prefix UL | M | | ENUMERATED(Normal, Extended, . . .) | | — | — |
| >>>Additional Special Subframe Info | O | | | Special subframe configuration information defined in TS 36.211 [10]. Only for newly defined configuration of special subframe from Release 11. | GLOBAL | ignore |
| >>>>Additional Special Subframe Patterns | M | | ENUMERATED(ssp0, ssp1, ssp2, ssp3, ssp4, ssp5, ssp6, ssp7, ssp8, ssp9, . . .) | | — | — |
| >>>>Cyclic Prefix DL | M | | ENUMERATED(Normal, Extended, . . .) | | — | — |
| >>>>Cyclic Prefix UL | M | | ENUMERATED(Normal, Extended, . . .) | | — | — |
| >>>Discovery Resource Pool 1 | | 0 | | Indicate information related to resource pool for D2D Discovery in Type 1 and Option 2 | YES | ignore |
| >>>>Resource Pool Period | O | | | | | |
| >>>>Discovery Region | O | | | Indicate the region which subtracts guard region from PUSCH region | | |
| >>>>Discovery Subframes | O | | INTEGER (2, . . . , 6) | Number of contiguous subframes which are reserved for uplink transmission | — | — |

TABLE 6-continued

| IE/Group Name | Presence | Range | IE type and reference | Semantics description | Criticality | Assigned Criticality |
|---|---|---|---|---|---|---|
| >>>>Radio Frame Number | O | | | Indicate number of radio frame used for D2D Discovery | | |
| >>>Discovery Resource Pool 2 | | 0 | | Indicate information related to resource pool for D2D Discovery in Type 2 and Option 2 | YES | ignore |
| >>>>Resource Pool Period | O | | | | | |
| >>>>Discovery Region | O | | | Indicate the region which subtracts guard region from PUSCH region | | |
| >>>>Discovery Subframes | O | | INTEGER (2, . . . , 6) | Number of contiguous subframes which are reserved for uplink transmission | — | — |
| >>>>Radio Frame Number | O | | | Indicate number of radio frame used for D2D Discovery | | |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED(n1, n2, n4, n8, n16, n32, . . .) | | — | — |
| >Radioframe Allocation Offset | M | | INTEGER (0 . . . 7, . . .) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

Referring to Table 6, for FDD frame structure, the Served Cell Information IE includes "Discovery Resource Pool 1" IE which indicates information related to the resource pool for D2D discovery in type 1, and "Discovery Resource Pool 2" IE which indicates information related to the resource pool for D2D Discovery in type 2. Both IEs include "Resource Pool Period" IE, "Discovery Region" IE which indicates the region which subtracts guard region from PUSCH region, "Resource Block" IE which indicates the number of frequency resources allocated for D2D discovery, and "Subframe Number" IE which indicates the number of time resources allocated for D2D discovery.

Further referring to Table 6, for TDD frame structure, the Served Cell Information IE includes "Subframe Assignment" IE which indicates the resource pool for D2D discovery in option 1 if the eNB can support D2D. For option 1 described above, the Served Cell Information IE includes "Discovery Resource Pool 1" IE which indicates information related to the resource pool for D2D discovery in type 1 and option 1, and "Discovery Resource Pool 2" IE which indicates information related to the resource pool for D2D discovery in type 2 and option 1. Both IEs include "Resource Pool Period" IE, "Discovery Region" IE which indicates the region which subtracts guard region from PUSCH region, and "Subframe Number" IE which indicates a set of subframe(s) which can be used for D2D discovery. The bitmap from the least significant bit position to the most significant bit position represents subframes #{2, 3, 4, 7, 8, 9} in a radio frame. Value "1" in a bit position indicates that the corresponding subframe can be used for D2D discovery, and value "0" indicates otherwise.

For option 2 described above, the Served Cell Information IE includes "Discovery Resource Pool 1" IE which indicates information related to the resource pool for D2D discovery in type 1 and option 2, and "Discovery Resource Pool 2" IE which indicates information related to the resource pool for D2D discovery in type 2 and option 2. Both IEs include "Resource Pool Period" IE, "Discovery Region" IE which indicates the region which subtracts guard region from PUSCH region, "Discovery Subframes" IE which indicates the number of contiguous subframes which are reserved for uplink transmission, and "Radio Frame Number" IE which indicates number of radio frame used for D2D discovery.

Figure 15:
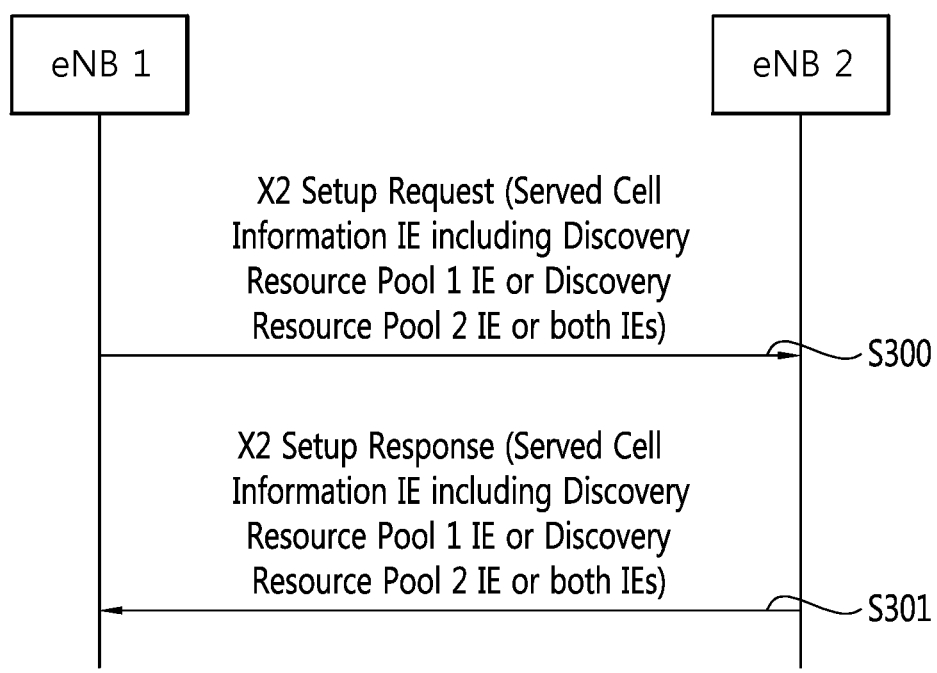
FIG. 15 shows another example of an X2 setup procedure according to an embodiment of the present invention.

FIG. 15 shows another example of an X2 setup procedure according to an embodiment of the present invention. In step S300, the eNB1 transmits an X2 setup request message to the eNB2. The X2 setup request message may include the Served Cell Information IE including the Discovery Resource Pool 1 IE or Discovery Resource Pool 2 IE or both IEs, described in Table 6. In step S301, the eNB2 transmits an X2 setup response message to the eNB1. The X2 setup response message may include the Served Cell Information IE including the Discovery Resource Pool 1 IE or Discovery Resource Pool 2 IE or both IEs, described in Table 6. Each eNB may allocate the resource pool for D2D discovery based on the received information.

Figure 16:
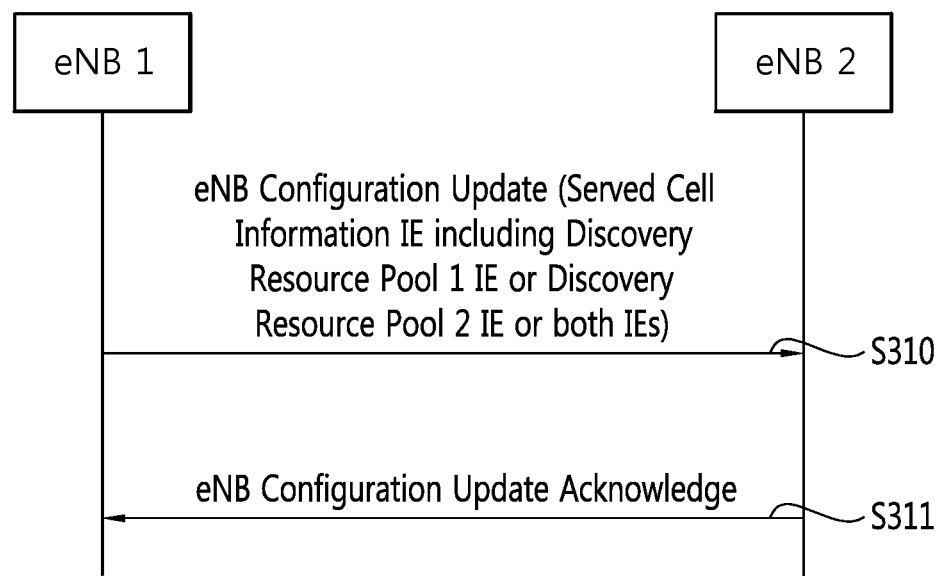
FIG. 16 shows another example of an eNB configuration update procedure according to an embodiment of the present invention.

FIG. 16 shows another example of an eNB configuration update procedure according to an embodiment of the present invention. In step S310, the eNB1 transmits an eNB configuration update message to the eNB2. The eNB configuration update message may include the Served Cell Information IE including the Discovery Resource Pool 1 IE or Discovery Resource Pool 2 IE or both IEs, described in Table 6. In step S311, the eNB2 transmits an eNB configuration update acknowledge message to the eNB1. The eNB2 may allocate the resource pool for D2D discovery based on the received information from the eNB1.

(2) Method Using a Load Indication Procedure

In order to inform a resource pool for D2D discovery to neighboring eNBs, the load indication procedure may be used. The purpose of the load indication procedure is to transfer load and interference co-ordination information between eNBs controlling intra-frequency neighboring cells.

Figure 17:
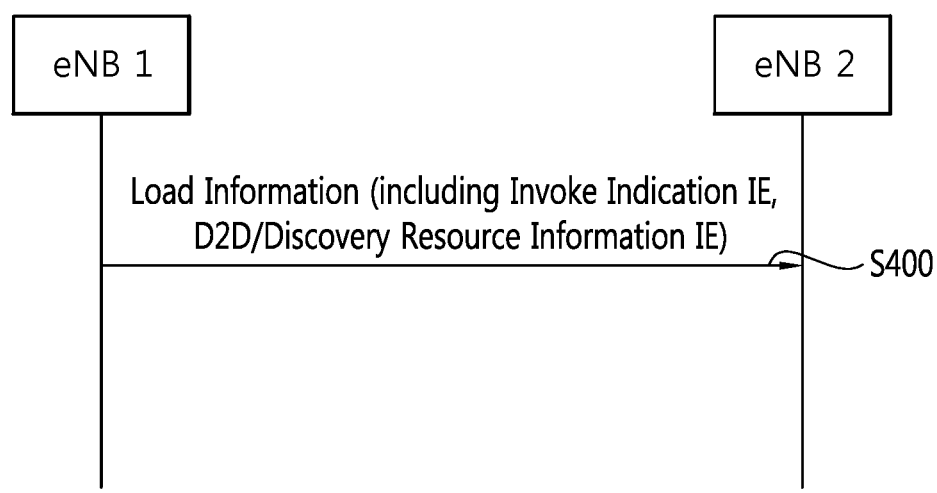
FIG. 17 shows an example of a load indication procedure according to an embodiment of the present invention.

FIG. 17 shows an example of a load indication procedure according to an embodiment of the present invention. In step S400, the eNB1 transmits a load information message to the eNB2. The load information message may include "D2D Resource Information IE" or "Discovery Resource Information" IE. By using at least one of the D2D Resource Information IE or Discovery Resource Information IE, the resource pool for D2D discovery may be indicated.

Table 7 shows an example of the load information message according to an embodiment of the present invention.

Referring to Table 7, the load information message includes "D2D Resource Information" IE.

The resource pool for D2D discovery may be defined by parameters such as frequency, time, combination of frequency and time (e.g., resource block), subframe, or combination thereof. Further, the resource pool for D2D discovery may be defined differently for FDD frame structure and TDD frame structure. Table 8 shows an example of the D2D Resource Information IE included in the load information message according to an embodiment of the present invention.

TABLE 8

| IE/Group Name | Presence | Range | IE type and reference | Semantics description |
|---|---|---|---|---|
| CHOICE D2D Resource Information | M | | — | — |
| >FDD | | | — | — |
| >>Discovery Resource Area | M | | | Indicate the resource area for D2D Discovery |
| >TDD | | | — | — |
| >>Discovery Resource Area | M | | | Indicate the resource area for D2D Discovery |

Referring to Table 8, the D2D Resource Information IE includes "Discovery Resource Area" which indicates the resource area for D2D discovery, for both FDD frame structure and TDD frame structure.

Table 9 shows another example of the D2D Resource Information IE included in the load information message according to an embodiment of the present invention. Since the eNB may use type 1 and/or type 2 for allocating

TABLE 7

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 . . . <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 . . . <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>D2D Resource Information | O | | 9.2.xx | | YES | ignore |
| >>Invoke Indication | O | | 9.2.55 | | YES | ignore | resources for D2D discovery, information on the resource pool for D2D discovery may be expressed per each type, distinctively. Similarly, since the eNB may use mode 1 and/or mode 2 for allocating resources for D2D communication, information on the resource pool for D2D communication may be expressed per each mode, distinctively.

TABLE 9

| IE/Group Name | Presence | Range | IE type and reference | Semantics description |
|---|---|---|---|---|
| CHOICE D2D Resource Information | M | | — | — |
| >FDD | | | — | — |
| >>D2D Resource Pool 1 | | 0 | | Indicate resource pool for D2D Discovery in Type 1 |
| >>>Resource Pool Period | M | | | |
| >>>Resource Block | M | | | Number of frequency resources allocated for D2D discovery |
| >>>Subframe Number | M | | | Number of time resources allocated for D2D discovery |
| >>D2D Resource Pool 2 | | 0 | | Indicate resource pool for D2D Discovery in Type 2 |
| >>>Resource Pool Period | M | | | |
| >>>Resource Block | M | | | Number of frequency resources allocated for D2D discovery |
| >>>Subframe Number | M | | | Number of time resources allocated for D2D discovery |
| >TDD | | | — | — |
| >>D2D Resource Pool 1 | | 0 | | Indicate resource pool for D2D Discovery in Type 1 and Option 1 |
| >>>Resource Pool Period | M | | | |
| >>>Subframe Assignment | M | | ENUMERATED(sa0, sa1, sa2, sa3, sa4, sa5, sa6, . . .) | Uplink-downlink subframe configuration information defined in TS 36.211 [10]. |
| >>>Subframe Number | M | | ENUMERATED(sn2, sn3, sn4, sn7, sn8, sn9, . . .) | Subframe number information used for discovery. Subframe number information defined in TS 36.211 [10]. |
| >>>PUSCH Region | M | | | Number of frequency resources allocated for D2D discovery except PUCCH |
| >>D2D Resource Pool 2 | | 0 | | Indicate resource pool for D2D Discovery in Type 2 and Option 1 |
| >>>Resource Pool Period | M | | | |
| >>>Subframe Assignment | M | | ENUMERATED(sa0, sa1, sa2, sa3, sa4, sa5, sa6, . . .) | Uplink-downlink subframe configuration information defined in TS 36.211 [10]. |
| >>>Subframe Number | M | | ENUMERATED(sn2, sn3, sn4, sn7, sn8, sn9, . . .) | Subframe number information used for discovery. Subframe number information defined in TS 36.211 [10]. |
| >>>PUSCH Region | M | | | Number of frequency resources allocated for D2D discovery except PUCCH |
| >>D2D Resource Pool 1 | | 0 | | Indicate resource pool for D2D Discovery in Type 1 and Option 2 |
| >>>Resource Pool Period | M | | | |
| >>>Discovery Subframes | M | | INTEGER (2, 3, . . .) | Number of contiguous subframes which are reserved for uplink transmission |
| >>>PUSCH Region | M | | | Number of frequency resources allocated for D2D discovery except PUCCH |
| >>D2D Resource Pool 2 | | 0 | | Indicate resource pool for D2D Discovery in Type 2 and Option 2 |

TABLE 9-continued

| IE/Group Name | Presence | Range | IE type and reference | Semantics description |
|---|---|---|---|---|
| >>>Resource Pool Period | M | | | |
| >>>Discovery Subframes | M | | INTEGER (2, 3, . . .) | Number of contiguous subframes which are reserved for uplink transmission |
| >>>PUSCH Region | M | | | Number of frequency resources allocated for D2D discovery except PUCCH |

Referring to Table 9, for FDD frame structure, the D2D Resource Information IE includes "D2D Resource Pool 1" IE which indicates the resource pool for D2D discovery in type 1, and "D2D Resource Pool 2" IE which indicates the resource pool for D2D Discovery in type 2. Both IEs include "Resource Pool Period" IE, "Resource Block" IE which indicates the number of frequency resources allocated for D2D discovery, and "Subframe Number" IE which indicates the number of time resources allocated for D2D discovery.

Further referring to Table 9, for TDD frame structure and option 1, the D2D Resource Information IE includes "D2D Resource Pool 1" IE which indicates the resource pool for D2D discovery in type 1 and option 1, and "D2D Resource Pool 2" IE which indicates the resource pool for D2D discovery in type 2 and option 1. Both IEs include "Resource Pool Period" IE, "Subframe Assignment" IE which indicates uplink-downlink subframe configuration, "Subframe Number" IE which indicates Subframe number information used for D2D discovery, and "PUSCH Region" IE which indicates the number of frequency resources allocated for D2D discovery except the PUCCH. For TDD frame structure and option 2, the D2D Resource Information IE includes "D2D Resource Pool 1" IE which indicates the resource pool for D2D discovery in type 1 and option 2, and "D2D Resource Pool 2" IE which indicates the resource pool for D2D discovery in type 2 and option 2. Both IEs include "Resource Pool Period" IE, "Discovery Subframes" IE which indicates the number of contiguous subframes which are reserved for uplink transmission, and "PUSCH Region" IE which indicates the number of frequency resources allocated for D2D discovery except the PUCCH.

Table 10 shows another example of the load information message according to an embodiment of the present invention. Since the eNB may use type 1 and/or type 2 for allocating resources for D2D discovery, information on the resource pool for D2D discovery may be expressed per each type, distinctively. Similarly, since the eNB may use mode 1 and/or mode 2 for allocating resources for D2D communication, information on the resource pool for D2D communication may be expressed per each mode, distinctively.

TABLE 10

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 . . . <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 . . . <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Discovery Resource Information | O | | 9.2.xx | | YES | ignore |
| >>Invoke Indication | O | | 9.2.55 | | YES | ignore |

Referring to Table 10, the load information message includes "Discovery Resource Information" IE. Table 11 shows an example of the Discovery Resource Information IE included in the load information message according to an embodiment of the present invention.

TABLE 11

| IE/Group Name | Presence | Range | IE type and reference | Semantics description |
|---|---|---|---|---|
| CHOICE Discovery Resource Information | M | — | — | — |
| >FDD | | | — | — |
| >>Discovery Resource Pool 1 | | 0 | | Indicate resource pool for D2D Discovery in Type 1 |
| >>>Resource Pool Period | O | | | |
| >>>Discovery Region | O | | | Indicate the region which subtracts guard region from PUSCH region |
| >>>Resource Block | O | | | Number of frequency resources allocated for D2D Discovery |
| >>>Subframe Number | O | | | Number of time resources allocated for D2D Discovery |
| >>Discovery Resource Pool 2 | | 0 | | Indicate resource pool for D2D Discovery in Type 2 |
| >>>Resource Pool Period | O | | | |
| >>>Discovery Region | O | | | Indicate the region which subtracts guard region from PUSCH region |
| >>>Resource Block | O | | | Number of frequency resources allocated for D2D Discovery |
| >>>Subframe Number | O | | | Number of time resources allocated for D2D Discovery |
| >TDD | | | — | — |
| >>Discovery Resource Pool 1 | | 0 | | Indicate resource pool for D2D Discovery in Type 1 and Option 1 |
| >>>Resource Pool Period | O | | | |
| >>>Discovery Region | O | | | Indicate the region which subtracts guard region from PUSCH region |
| >>>Subframe Assignment | O | | ENUMERATED(sa0, sa1, sa2, sa3, sa4, sa5, sa6, . . .) | Uplink-downlink subframe configuration information defined in TS 36.211 [10]. |
| >>>Subframe Number | O | | BITSTRING(SIZE(6)) | A set of subframe(s) which can be used for D2D Discovery. The bitmap from the least significant bit position to the most significant bit position represents subframes #{2, 3, 4, 7, 8, 9} in a radio frame. Value "1" in a bit position indicates that the corresponding subframe can be used for D2D Discovery; and value "0" indicates otherwise. |
| >>>Radio Frame Number | O | | | Indicate number of radio frame used for D2D Discovery |
| >>Discovery Resource Pool 2 | | 0 | | Indicate resource pool for D2D Discovery in Type 2 and Option 1 |
| >>>Resource Pool Period | O | | | |
| >>>Discovery Region | O | | | Indicate the region which subtracts guard region from PUSCH region |
| >>>Subframe Assignment | O | | ENUMERATED(sa0, sa1, sa2, sa3, sa4, sa5, sa6, . . .) | Uplink-downlink subframe configuration information defined in TS 36.211 [10]. |
| >>>Subframe Number | O | | BITSTRING(SIZE(6)) | A set of subframe(s) which can be used for D2D Discovery. The bitmap from the least significant bit position to the most significant bit position represents subframes #{2, 3, 4, 7, 8, 9} in a radio frame. Value "1" in a bit position indicates that the corresponding subframe can be used for D2D Discovery; and value "0" indicates otherwise. |

TABLE 11-continued

| IE/Group Name | Presence | Range | IE type and reference | Semantics description |
|---|---|---|---|---|
| >>>Radio Frame Number | O | | | Indicate number of radio frame used for D2D Discovery |
| >>Discovery Resource Pool 1 | | 0 | | Indicate resource pool for D2D Discovery in Type 1 and Option 2 |
| >>>Resource Pool Period | O | | | |
| >>>Discovery Region | O | | | Indicate the region which subtracts guard region from PUSCH region |
| >>>Discovery Subframes | O | | INTEGER (2, . . . , 6) | Number of contiguous subframes which are reserved for uplink transmission |
| >>>Radio Frame Number | O | | | Indicate number of radio frame used for D2D Discovery |
| >>Discovery Resource Pool 2 | | 0 | | Indicate resource pool for D2D Discovery in Type 2 and Option 2 |
| >>>Resource Pool Period | O | | | |
| >>>Discovery Region | O | | | Indicate the region which subtracts guard region from PUSCH region |
| >>>Discovery Subframes | O | | INTEGER (2, . . . , 6) | Number of contiguous subframes which are reserved for uplink transmission |
| >>>Radio Frame Number | O | | | Indicate number of radio frame used for D2D Discovery |

Referring to Table 11, for FDD frame structure, the D2D Resource Information IE includes "Discovery Resource Pool 1" IE which indicates the resource pool for D2D discovery in type 1, and "Discovery Resource Pool 2" IE which indicates the resource pool for D2D Discovery in type 2. Both IEs include "Resource Pool Period" IE, "Discovery Region" IE which indicates the region which subtracts guard region from PUSCH region, "Resource Block" IE which indicates the number of frequency resources allocated for D2D discovery, and "Subframe Number" IE which indicates the number of time resources allocated for D2D discovery.

Further referring to Table 11, for TDD frame structure and option 1, the D2D Resource Information IE includes "Discovery Resource Pool 1" IE which indicates the resource pool for D2D discovery in type 1 and option 1, and "Discovery Resource Pool 2" IE which indicates the resource pool for D2D discovery in type 2 and option 1. Both IEs include "Resource Pool Period" IE, "Discovery Region" IE which indicates the region which subtracts guard region from PUSCH region, "Subframe Assignment" IE which indicates uplink-downlink subframe configuration, "Subframe Number" IE which indicates a set of subframe(s) which can be used for D2D discovery, and "Radio Frame Number" IE which indicates number of radio frame used for D2D discovery.

For TDD frame structure and option 2, the D2D Resource Information IE includes "Discovery Resource Pool 1" IE which indicates the resource pool for D2D discovery in type 1 and option 2, and "Discovery Resource Pool 2" IE which indicates the resource pool for D2D discovery in type 2 and option 2. Both IEs include "Resource Pool Period" IE, "Discovery Region" IE which indicates the region which subtracts guard region from PUSCH region, "Discovery Subframes" IE which indicates the number of contiguous subframes which are reserved for uplink transmission, and "Radio Frame Number" IE which indicates number of radio frame used for D2D discovery.

Further, the load information message may further include "Invoke Indication" IE. The Invoke Indication IE included in the load information message may indicate request of the resource pool for D2D discovery. Table 12 shows an example of the Invoke Indication IE according to an embodiment of the present invention.

TABLE 12

| IE/Group Name | Presence | Range | IE type and reference | Semantics description |
|---|---|---|---|---|
| Invoke Indication | M | | ENUMERATED (ABS Information, D2D Resource Information, . . .) | — |

Referring to Table 12, the Invoke Indication IE includes D2D Resource Information.

(3) Method Using a Resource Status Reporting Initiating Procedure and Resource Status Reporting Procedure In order to inform a resource pool for D2D discovery to neighboring eNBs, the resource status reporting initiating procedure and resource status reporting procedure may be used. The resource status reporting initiating is used by an eNB to request the reporting of load measurements to another eNB. The resource status reporting procedure is initiated by eNB2 to report the result of measurements admitted by eNB2 following a successful resource status reporting initiation procedure.

Figure 18:
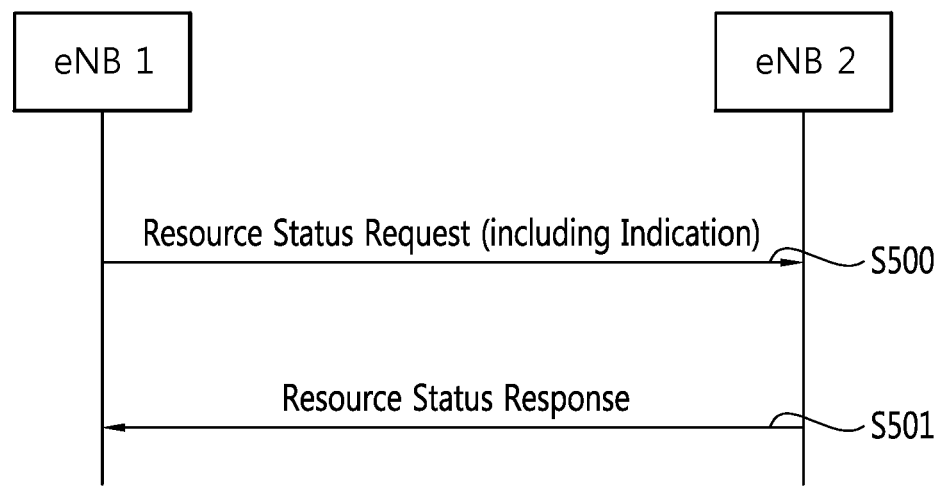
FIG. 18 shows an example of a resource status reporting initiating procedure according to an embodiment of the present invention.

FIG. 18 shows an example of a resource status reporting initiating procedure according to an embodiment of the present invention. In step S500, the eNB1 transmits a resource status request message including an indication to the eNB2. By transmitting the resource status request message, the eNB 1 may request the resource pool for D2D discovery of the eNB2. The indication may indicate triggering the resource status reporting initiating procedure to the eNB2. In step S501, the eNB2 transmits a resource status response message to the eNB1.

Table 13 shows an example of the resource status request message according to an embodiment of the present invention.

TABLE 13

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ...) | Allocated by eNB$_1$ | YES | reject |
| eNB2 Measurement ID | C-ifRegistrationRequestStop | | INTEGER (1 ... 4095, ...) | Allocated by eNB$_2$ | YES | ignore |
| Registration Request | M | | ENUMERATED(start, stop, ...) | A value set to "stop", indicates a request to stop all cells measurements. | YES | reject |
| Report Characteristics | O | | BITSTRING (SIZE(32)) | Each position in the bitmap indicates measurement object the eNB$_2$ is requested to report. First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Sixth Bit = D2D Resource Status Periodic. Other bits shall be ignored by the eNB$_2$. | YES | reject |
| Cell To Report | | 1 | | Cell ID list for which measurement is needed | YES | ignore |
| >Cell To Report Item | | 1 ... <maxCellineNB> | | | EACH | ignore |
| >>Cell ID | M | | ECGI 9.2.14 | | — | — |
| Reporting Periodicity | O | | ENUMERATED(1000 ms, 2000 ms, 5000 ms, 10000 ms, ...) | | YES | ignore |
| Partial Success Indicator | O | | ENUMERATED(partial success allowed, ...) | Included if partial success is allowed | YES | ignore |
| Indication | O | | | Indicate triggering Resource Status Reporting Initiating procedure to receiving eNB | YES | ignore |

Referring to Table 13, the resource status request message includes "Report Characteristic" IE which may indicate periodic D2D resource status report by receiving eNB, and "Indication" IE which indicates triggering the resource status reporting initiating procedure to receiving eNB.

Figure 19:
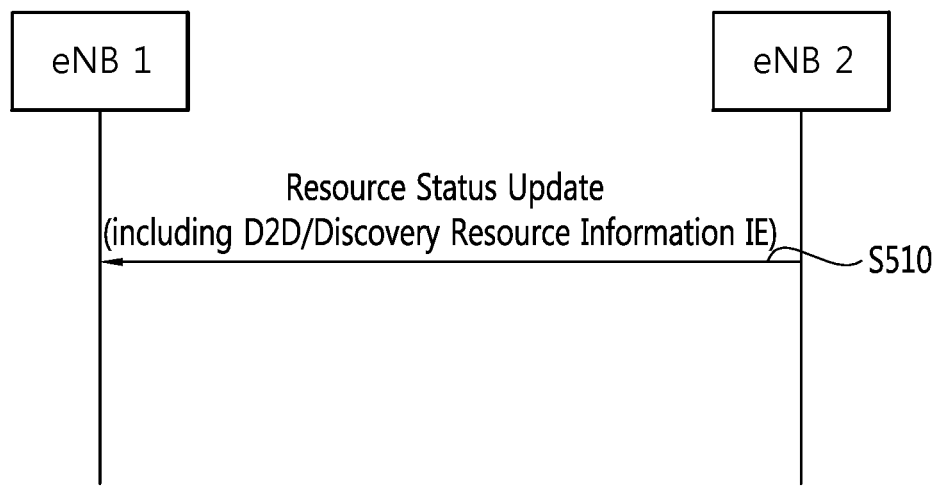
FIG. 19 shows an example of a resource status reporting procedure according to an embodiment of the present invention.

FIG. 19 shows an example of a resource status reporting procedure according to an embodiment of the present invention. In step S510, the eNB2 transmits a resource status update message to the eNB1. The resource status update message may include the resource pool for D2D discovery.

Table 14 shows an example of the resource status update message according to an embodiment of the present invention.

TABLE 14

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by eNB$_1$ | YES | reject |
| eNB2 Measurement ID | M | | INTEGER (1 ... 4095, ...) | Allocated by eNB$_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |

TABLE 14-continued

| IE/Group Name | Presence | Range | IE type and reference | Semantics description | Criticality | Assigned Criticality |
|---|---|---|---|---|---|---|
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >>D2D Resource Information | O | | 9.2.xx | | YES | Ignore |

Referring to Table 14, the resource status update message includes "D2D Resource Information" IE which indicates the resource pool for D2D discovery. The D2D Resource Information IE may be the D2D Resource Information IE described above in Table 9. Since the eNB may use type 1 and/or type 2 for allocating resources for D2D discovery, information on the resource pool for D2D discovery may be expressed per each type, distinctively. Similarly, since the eNB may use mode 1 and/or mode 2 for allocating resources for D2D communication, information on the resource pool for D2D communication may be expressed per each mode, distinctively.

Table 15 shows another example of the resource status update message according to an embodiment of the present invention.

allocating resources for D2D communication, information on the resource pool for D2D communication may be expressed per each mode, distinctively.

Figure 20:
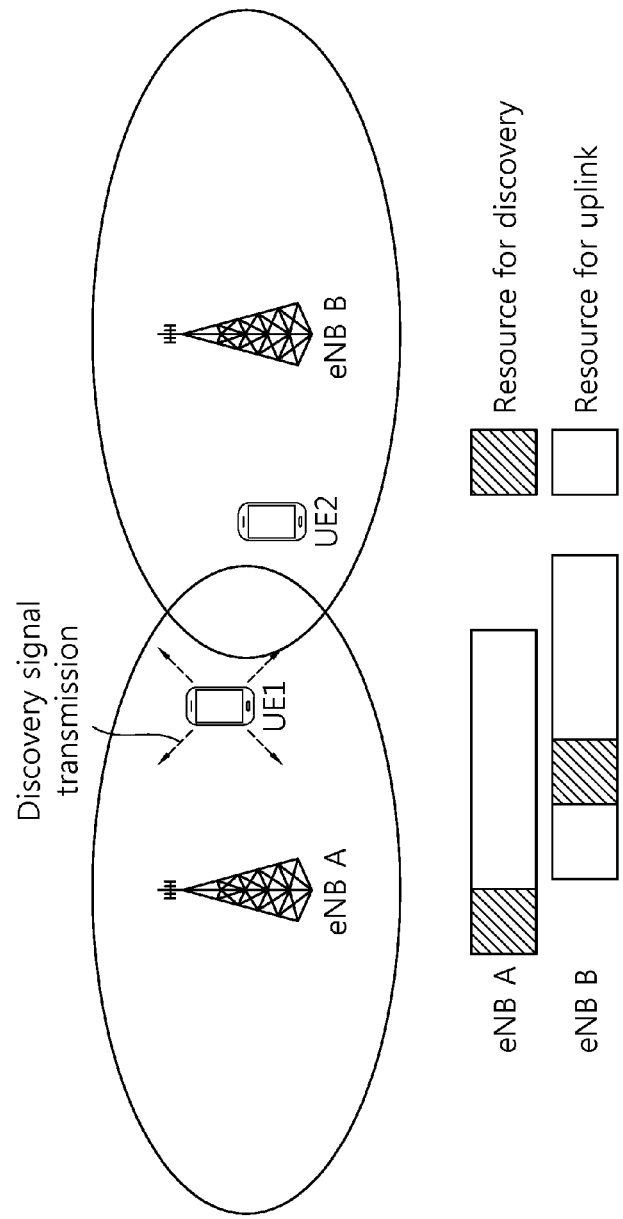
FIG. 20 shows an example of a case that each eNB has a different starting point of a radio frame according to an embodiment of the present invention.

FIG. 20 shows an example of a case that each eNB has a different starting point of a radio frame according to an embodiment of the present invention. Referring to FIG. 20, for FDD frame structure, a starting point of a radio frame of eNB A and eNB B are different from each other. In this case, an indication which indicates a starting point of a radio frame may be further indicated. The indication may be included in the Served Cell Information IE described above, in addition to the present invention described above. Alternatively, the indication may be included in the D2D

TABLE 15

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by $eNB_1$ | YES | reject |
| eNB2 Measurement ID | M | | INTEGER (1 ... 4095, ...) | Allocated by $eNB_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >>Discovery Resource Information | O | | 9.2.xx | | YES | Ignore |

Referring to Table 15, the resource status update message includes "Discovery Resource Information" IE which indicates the resource pool for D2D discovery. The Discovery Resource Information IE may be the Discovery Resource Information IE described above in Table 11. Since the eNB may use type 1 and/or type 2 for allocating resources for D2D discovery, information on the resource pool for D2D discovery may be expressed per each type, distinctively. Similarly, since the eNB may use mode 1 and/or mode 2 for Resource Information IE described above, in addition to the present invention described above. The starting point of the radio frame may be indicated by one of a subframe unit, slot unit, or symbol unit. Further, since synchronization of the eNB may be drifted, the indication may be indicated periodically.

Table 16 shows an example of the Served Cell Information IE according to an embodiment of the present invention.

TABLE 16

| IE/Group Name | Presence | Range | IE type and reference | Semantics description | Criticality | Assigned Criticality |
|---|---|---|---|---|---|---|
| PCI | M | | INTEGER (0 ... 503, ...) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | | |
| >>>UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >>>DL EARFCN | M | | EARFCN 9.2.26 | Corresponds to $N_{DL}$ in TS 36.104 [16] | — | — |
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signalled in the UL EARFCN IE is ignored. | YES | reject |
| >>>DL EARFCN Extension | O | | EARFCN Extension 9.2.65 | If this IE is present, the value signalled in the DL EARFCN IE is ignored. | YES | reject |
| >>>Indication | O | | | Indicate the starting point of radio frame to neighbouring eNB | | |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED(sa0, sa1, sa2, sa3, sa4, sa5, sa6, ...) | Uplink-downlink subframe configuration information defined in TS 36.211 [10] | — | — |
| >>>Special Subframe Info | | 1 | | Special subframe configuration information defined in TS 36.211 [10] | — | — |
| >>>>Special Subframe Patterns | M | | ENUMERATED(ssp0, ssp1, ssp2, ssp3, ssp4, ssp5, ssp6, ssp7, ssp8, ...) | | — | — |
| >>EARFCN Extension | O | | 9.2.65 | If this IE is present, the value signalled in the EARFCN IE is ignored. | YES | reject |
| >>>>Cyclic Prefix DL | M | | ENUMERATED(Normal, Extended, ...) | | — | — |
| >>>>Cyclic Prefix UL | M | | ENUMERATED(Normal, Extended, ...) | | — | — |

TABLE 16-continued

| IE/Group Name | Presence | Range | IE type and reference | Semantics description | Criticality | Assigned Criticality |
|---|---|---|---|---|---|---|
| >>>Additional Special Subframe Info | O | | | Special subframe configuration information defined in TS 36.211 [10]. Only for newly defined configuration of special subframe from Release 11. | GLOBAL | ignore |
| >>>>Additional Special Subframe Patterns | M | | ENUMERATED(ssp0, ssp1, ssp2, ssp3, ssp4, ssp5, ssp6, ssp7, ssp8, ssp9, . . .) | | — | — |
| >>>>Cyclic Prefix DL | M | | ENUMERATED(Normal, Extended, . . .) | | — | — |
| >>>>Cyclic Prefix UL | M | | ENUMERATED(Normal, Extended, . . .) | | — | — |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED(n1, n2, n4, n8, n16, n32, . . .) | | — | — |
| >Radioframe Allocation Offset | M | | INTEGER (0 . . . 7, . . .) | | — | — |
| >Subframe Allocation | M | | 9.2.51 | | — | — |
| CSG ID | O | | 9.2.53 | | YES | ignore |
| MBMS Service Area Identity List | | 0 . . . <maxnoofMBMSServiceAreaIdentities> | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

Referring to Table 20, the Served Cell Information IE includes "Indication" IE which indicates the starting point of a radio frame.

Figure 21:
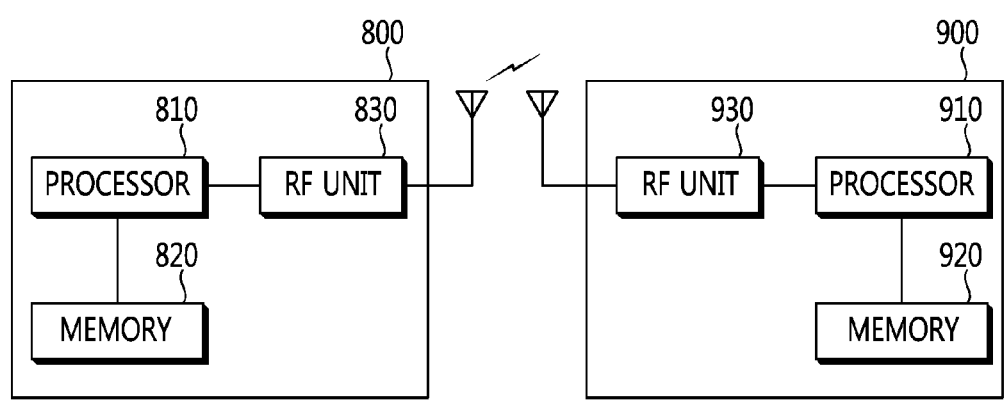
FIG. 21 shows a wireless communication system to implement an embodiment of the present invention.

FIG. 21 shows a wireless communication system to implement an embodiment of the present invention.

A first eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB or MME 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for indicating, by a first evolved NodeB (eNB), a resource pool for device-to-device (D2D) transmission in a wireless communication system, the method comprising:
   transmitting, by the first eNB, information on a resource pool of the first eNB for D2D transmission; and
   receiving, by the first eNB, information on a resource pool of a second eNB for D2D transmission,
   wherein, when the resource pool is dependent upon an uplink-downlink configuration number, the information on the resource pool of the first eNB includes:
   a first uplink-downlink configuration number,
   a first subframe number, and
   a first region allocated for the resource pool for a time division duplex (TDD) frame structure, and
   wherein, when the resource pool is dependent upon the uplink-downlink configuration number, the information on the resource pool of the second eNB includes:
   a second uplink-downlink configuration number,
   a second subframe number, and
   a second region allocated for the resource pool for the TDD frame structure.

2. The method of claim 1, wherein:
   the information on the resource pool of the first eNB includes a number of first resources blocks and a number of first subframes allocated for the resource pool for a frequency division duplex (FDD) frame structure; and
   the information on the resource pool of the second eNB includes a number of second resources blocks and a number of second subframes allocated for the resource pool for the FDD frame structure.

3. The method of claim 1, wherein:
   when the resource pool is not dependent upon the uplink-downlink configuration number, the information on the resource pool of the first eNB includes a number of first contiguous uplink subframes and the first region allocated for the resource pool for the TDD frame structure; and
   when the resource pool is not dependent upon the uplink-downlink configuration number, the information on the resource pool of the second eNB includes a number of second contiguous uplink subframes and the second region allocated for the resource pool for the TDD frame structure.

4. The method of claim 1, wherein:
   the information on the resource pool of the first eNB further includes information on a first discovery region;
   the information on the resource pool of the second eNB further includes information on a second discovery region; and
   the first discovery region and the second discovery region are regions that exclude a guard region from a physical uplink shared channel (PUSCH) region.

5. The method of claim 1, wherein:
   the information on the resource pool of the first eNB includes a first period of the resource pool of the first eNB; and
   the information on the resource pool of the second eNB includes a second period of the resource pool of the second eNB.

6. The method of claim 1, wherein the D2D transmission includes at least one of: a D2D discovery and a D2D communication.

7. The method of claim 6, wherein the information on the resource pool of the first eNB or the second eNB is configured per each type of the D2D discovery.

8. The method of claim 6, wherein the information on the resource pool of the first eNB or the second eNB is configured per each mode of the D2D communication.

9. The method of claim 1, wherein the information on the resource pool of the first eNB or the second eNB is transmitted or received via one of: an X2 setup request message, an X2 setup response message, and an eNB configuration update message.

10. The method of claim 1, wherein the information on the resource pool of the first eNB or the second eNB is transmitted or received via a load information message.

11. The method of claim 10, wherein the load information message includes an invoke indication information element (IE) indicating request of the information on the resource pool of the second eNB.

12. The method of claim 1, wherein the information on the resource pool of the first eNB or the second eNB is transmitted or received via a resource status update message.

13. The method of claim 12, further comprising transmitting a resource status request message, the resource status request message including an indication triggering the information on the resource pool of the second eNB.

14. The method of claim 1, wherein the information on the resource pool of the first eNB or the second eNB includes a starting point of a radio frame.

15. A first evolved NodeB (eNB) configured to indicate a resource pool for device-to-device (D2D) transmission in a wireless communication system, the first eNB comprising:
   a radio frequency (RF) unit configured to transmit or receive a radio signal; and
   a processor coupled to the RF unit, the processor configured to:
   transmit information on a resource pool of the first eNB for D2D transmission; and
   receive information on a resource pool of a second eNB for D2D transmission,
   wherein, when the resource pool is dependent upon an uplink-downlink configuration number, the information on the resource pool of the first eNB includes:
   a first uplink-downlink configuration number,
   a first subframe number, and
   a first region allocated for the resource pool for a time division duplex (TDD) frame structure, and
   wherein, when the resource pool is dependent upon the uplink-downlink configuration number, the information on the resource pool of the second eNB includes:
   a second uplink-downlink configuration number,
   a second subframe number, and
   a second region allocated for the resource pool for the TDD frame structure.

* * * * *